(12) United States Patent
Healey

(10) Patent No.: US 8,882,875 B2
(45) Date of Patent: *Nov. 11, 2014

(54) WAVED FILTER MEDIA AND ELEMENTS

(75) Inventor: David T. Healey, Bellingham, MA (US)

(73) Assignee: Hollingsworth & Vose Company, East Walpole, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/565,524

(22) Filed: Aug. 2, 2012

(65) Prior Publication Data

US 2013/0025245 A1    Jan. 31, 2013

Related U.S. Application Data

(63) Continuation of application No. 12/508,770, filed on Jul. 24, 2009, now Pat. No. 8,257,459, which is a continuation-in-part of application No. 12/399,281, filed on Mar. 6, 2009, now Pat. No. 8,202,340, which is a continuation-in-part of application No. 12/038,049, filed on Feb. 27, 2008, now Pat. No. 7,883,562.

(60) Provisional application No. 60/892,025, filed on Feb. 28, 2007, provisional application No. 60/986,626, filed on Nov. 9, 2007.

(51) Int. Cl.
| | |
|---|---|
| B01D 46/00 | (2006.01) |
| B01D 39/16 | (2006.01) |
| B01D 39/20 | (2006.01) |
| B01D 69/02 | (2006.01) |
| B01D 46/52 | (2006.01) |
| B01D 69/10 | (2006.01) |
| B01D 39/18 | (2006.01) |
| B01D 63/14 | (2006.01) |
| B01D 71/36 | (2006.01) |

(52) U.S. Cl.
CPC .......... *B01D 46/522* (2013.01); *B01D 39/1692* (2013.01); *B01D 2313/20* (2013.01); *B01D 2275/10* (2013.01); *B01D 39/202* (2013.01); *B01D 39/2017* (2013.01); *B01D 69/02* (2013.01); *B01D 71/36* (2013.01); *B01D 2239/0216* (2013.01); *B01D 39/1623* (2013.01); *B01D 69/10* (2013.01); *B01D 39/18* (2013.01); *B01D 2239/0654* (2013.01); *B01D 63/14* (2013.01)
USPC ............. 55/487; 55/486; 55/521; 96/4; 96/11

(58) Field of Classification Search
USPC .............................. 55/486, 487, 521; 96/4, 11
See application file for complete search history.

(56) References Cited

U.S. PATENT DOCUMENTS

| | | | |
|---|---|---|---|
| 2,409,066 A | 10/1946 | Powell et al. | |
| 2,500,690 A | 3/1950 | Lannan | |

(Continued)

FOREIGN PATENT DOCUMENTS

| | | |
|---|---|---|
| CN | 1211935 A | 3/1999 |
| DE | 196 13 463 A1 | 10/1997 |

(Continued)

OTHER PUBLICATIONS

European Search Report for EP 08730820.1 mailed Jul. 20, 2010.

(Continued)

*Primary Examiner* — Robert Clemente
(74) *Attorney, Agent, or Firm* — Wolf, Greenfield & Sacks, P.C.

(57) ABSTRACT

Various high performance, high efficiency filter media are provided that are cost effective and easy to manufacture. In particular, various filter media are provided having at least one layer with a waved configuration that results in an increased surface area, thereby enhancing various properties of the filter media. The filter media can be used to form a variety of filter elements for use in various applications.

12 Claims, 15 Drawing Sheets

(56) References Cited

U.S. PATENT DOCUMENTS

| | | | |
|---|---|---|---|
| 2,862,542 A | 12/1958 | Norton | |
| 3,012,923 A | 12/1961 | Slayter | |
| 3,180,775 A | 4/1965 | Sexsmith et al. | |
| 3,214,323 A | 10/1965 | Russell et al. | |
| 3,616,031 A | 10/1971 | Fleissner et al. | |
| 3,616,035 A | 10/1971 | Baskerville et al. | |
| 3,949,128 A | 4/1976 | Ostermeier et al. | |
| 4,089,783 A | 5/1978 | Holyoak | |
| 4,111,733 A | 9/1978 | Periers | |
| 4,576,853 A | 3/1986 | Vaughn et al. | |
| RE32,171 E | 6/1986 | van Turnhout | |
| 4,650,506 A | 3/1987 | Barris et al. | |
| 4,701,197 A | 10/1987 | Thornton et al. | |
| 4,874,399 A | 10/1989 | Reed et al. | |
| 4,874,457 A | 10/1989 | Swieringa et al. | |
| 4,961,974 A | 10/1990 | Jones | |
| 5,084,178 A | 1/1992 | Miller et al. | |
| 5,098,767 A | 3/1992 | Linnersten | |
| 5,167,740 A | 12/1992 | Michaelis et al. | |
| 5,344,956 A | 9/1994 | Allewaert et al. | |
| 5,350,620 A | 9/1994 | Sundet et al. | |
| 5,397,632 A | 3/1995 | Murphy et al. | |
| 5,401,446 A | 3/1995 | Tsai et al. | |
| 5,491,016 A | 2/1996 | Kaiser et al. | |
| 5,558,924 A | 9/1996 | Chien et al. | |
| 5,580,459 A | 12/1996 | Powers et al. | |
| 5,620,545 A | 4/1997 | Braun et al. | |
| 5,645,627 A | 7/1997 | Lifshutz et al. | |
| 5,656,368 A | 8/1997 | Braun et al. | |
| 5,672,399 A | 9/1997 | Kahlbaugh et al. | |
| 5,674,302 A | 10/1997 | Nakayama et al. | |
| 5,686,050 A | 11/1997 | Wadsworth et al. | |
| 5,785,725 A | 7/1998 | Cusick et al. | |
| 5,804,512 A | 9/1998 | Lickfield et al. | |
| 5,814,219 A | 9/1998 | Friedmann et al. | |
| 5,820,645 A | 10/1998 | Murphy | |
| 5,830,311 A | 11/1998 | Braun et al. | |
| 5,855,783 A | 1/1999 | Shucosky et al. | |
| 5,858,045 A | 1/1999 | Stemmer et al. | |
| 5,955,174 A | 9/1999 | Wadsworth et al. | |
| 5,993,501 A | 11/1999 | Cusick et al. | |
| 5,993,580 A | 11/1999 | Nakayama et al. | |
| 6,030,428 A | 2/2000 | Ishino et al. | |
| 6,090,469 A | 7/2000 | Wadsworth et al. | |
| 6,146,436 A | 11/2000 | Hollingsworth et al. | |
| 6,171,684 B1 | 1/2001 | Kahlbaugh et al. | |
| 6,200,368 B1 | 3/2001 | Guerin et al. | |
| 6,315,805 B1 | 11/2001 | Strauss | |
| 6,322,615 B1 | 11/2001 | Chapman | |
| 6,397,458 B1 | 6/2002 | Jones et al. | |
| 6,397,632 B1 | 6/2002 | Meagher | |
| 6,398,847 B1 | 6/2002 | Jones et al. | |
| 6,409,806 B1 | 6/2002 | Jones et al. | |
| 6,416,562 B1 | 7/2002 | Shibuya et al. | |
| 6,428,610 B1 | 8/2002 | Tsai et al. | |
| 6,432,175 B1 | 8/2002 | Jones et al. | |
| 6,514,324 B1 | 2/2003 | Chapman | |
| 6,554,881 B1 | 4/2003 | Healey | |
| 6,562,112 B2 | 5/2003 | Jones et al. | |
| 6,627,563 B1 | 9/2003 | Huberty | |
| 6,635,136 B2 | 10/2003 | White et al. | |
| 6,656,400 B2 | 12/2003 | Veeser et al. | |
| 6,660,210 B2 | 12/2003 | Jones et al. | |
| 6,743,273 B2 | 6/2004 | Chung et al. | |
| 6,780,226 B1 | 8/2004 | Lifshutz et al. | |
| 6,808,551 B2 | 10/2004 | Jones et al. | |
| 6,808,553 B2 * | 10/2004 | Kawano et al. | 95/287 |
| 6,821,321 B2 | 11/2004 | Chinn et al. | |
| 6,858,057 B2 | 2/2005 | Healey | |
| 6,867,156 B1 | 3/2005 | White et al. | |
| 6,867,256 B1 | 3/2005 | Di Silvestro et al. | |
| 6,872,311 B2 | 3/2005 | Koslow | |
| 6,872,431 B2 | 3/2005 | Kahlbaugh et al. | |
| 6,932,907 B2 * | 8/2005 | Haq et al. | 210/433.1 |
| 6,953,544 B2 | 10/2005 | Jones et al. | |
| 6,986,804 B2 | 1/2006 | Dominiak et al. | |
| 6,998,164 B2 | 2/2006 | Neely et al. | |
| 7,008,465 B2 | 3/2006 | Graham et al. | |
| 7,045,029 B2 | 5/2006 | DeLucia et al. | |
| 7,137,510 B1 | 11/2006 | Klein et al. | |
| 7,314,497 B2 | 1/2008 | Kahlbaugh et al. | |
| 7,326,272 B2 | 2/2008 | Hornfeck et al. | |
| 7,883,562 B2 | 2/2011 | Healey et al. | |
| 7,959,751 B2 | 6/2011 | Hanson et al. | |
| 8,197,569 B2 | 6/2012 | Healey et al. | |
| 8,202,340 B2 | 6/2012 | Healey et al. | |
| 8,257,459 B2 * | 9/2012 | Healey et al. | 55/486 |
| 8,262,780 B2 * | 9/2012 | Smithies et al. | 96/12 |
| 8,394,183 B2 * | 3/2013 | Ishida et al. | 96/12 |
| 2003/0022584 A1 | 1/2003 | Latimer et al. | |
| 2003/0150199 A1 | 8/2003 | Tanaka et al. | |
| 2003/0203695 A1 | 10/2003 | Polanco et al. | |
| 2003/0203696 A1 | 10/2003 | Healey et al. | |
| 2003/0213109 A1 | 11/2003 | Neely et al. | |
| 2004/0060269 A1 | 4/2004 | Chung et al. | |
| 2005/0011173 A1 | 1/2005 | Hornfeck et al. | |
| 2005/0193696 A1 | 9/2005 | Muller et al. | |
| 2006/0042049 A1 | 3/2006 | Petersen et al. | |
| 2006/0091066 A1 | 5/2006 | Driml | |
| 2006/0272303 A1 | 12/2006 | Fujiwara et al. | |
| 2007/0084786 A1 | 4/2007 | Smithies et al. | |
| 2008/0023121 A1 | 1/2008 | Hanson et al. | |
| 2008/0067121 A1 | 3/2008 | Ter Horst et al. | |
| 2008/0110342 A1 | 5/2008 | Ensor et al. | |
| 2008/0202078 A1 | 8/2008 | Healey et al. | |
| 2008/0217241 A1 | 9/2008 | Smithies et al. | |
| 2008/0302242 A1 | 12/2008 | Schelling et al. | |
| 2009/0272084 A1 | 11/2009 | Healey et al. | |
| 2011/0162337 A1 | 7/2011 | Healey et al. | |
| 2012/0304602 A1 | 12/2012 | Healey et al. | |
| 2013/0263738 A1 * | 10/2013 | Wang et al. | 95/285 |

FOREIGN PATENT DOCUMENTS

| | | | |
|---|---|---|---|
| GB | 2 145 126 | | 3/1985 |
| GB | 2 389 326 | | 12/2003 |
| JP | 58088019 A | * | 5/1983 |
| JP | 62-024922 U | | 2/1987 |
| JP | 62-087723 U | | 6/1987 |
| JP | 04-045813 A | | 2/1992 |
| JP | 04-180808 A | | 6/1992 |
| JP | 08-024546 A | | 1/1996 |
| JP | 3074719 U | | 1/2001 |
| JP | 2001-179028 A | | 7/2001 |
| JP | 2003-181228 A | | 7/2003 |
| WO | WO 94/11089 A1 | | 5/1994 |
| WO | WO 01/08781 A2 | | 2/2001 |
| WO | WO 2007/147062 A2 | | 12/2007 |
| WO | WO 2007/147065 A2 | | 12/2007 |
| WO | WO 2008/150548 A2 | | 12/2008 |
| WO | WO 2009057557 A1 | * | 5/2009 |

OTHER PUBLICATIONS

Office Action for Japanese Application No. 2009-552011 issued May 31, 2011.

International Search Report and Written Opinion for PCT/US2008/055088 mailed Jul. 29, 2008.

International Preliminary Report on Patentability for PCT/US2008/055088 mailed Jun. 16, 2009.

International Search Report and Written Opinion for PCT/US2010/00656 mailed May 7, 2010.

International Preliminary Report on Patentability for International Application No. PCT/US2010/000656 mailed Sep. 15, 2011.

International Search Report and Written Opinion for International Application No. PCT/US2010/002081, mailed Apr. 12, 2011.

International Preliminary Report on Patentability for International Application No. PCT/US2010/002081 mailed Feb. 2, 2012.

* cited by examiner

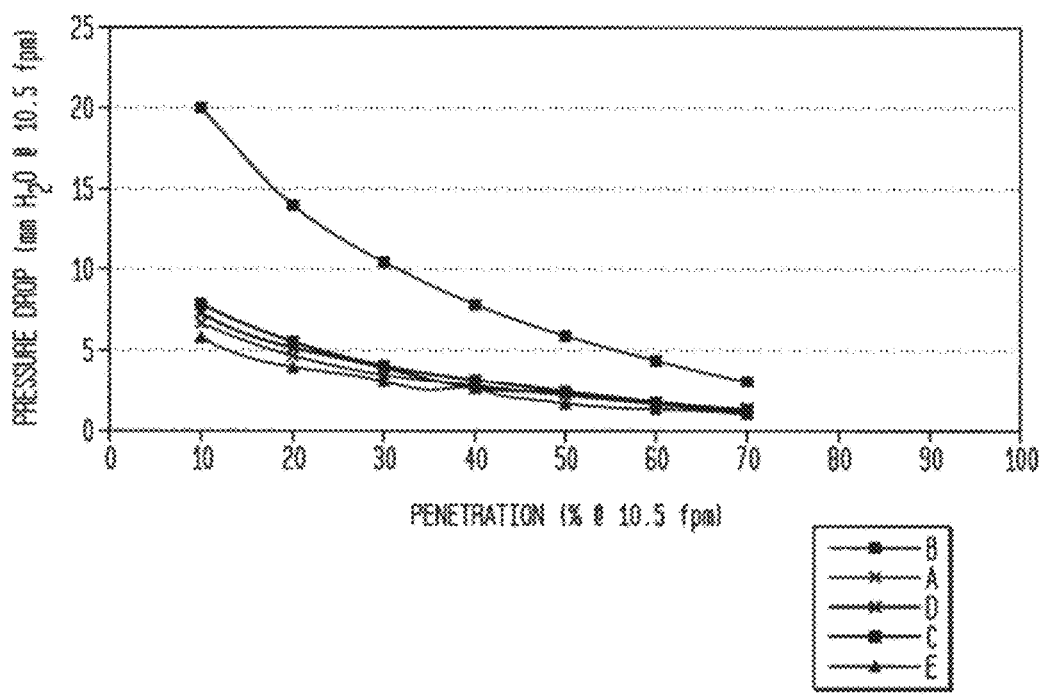

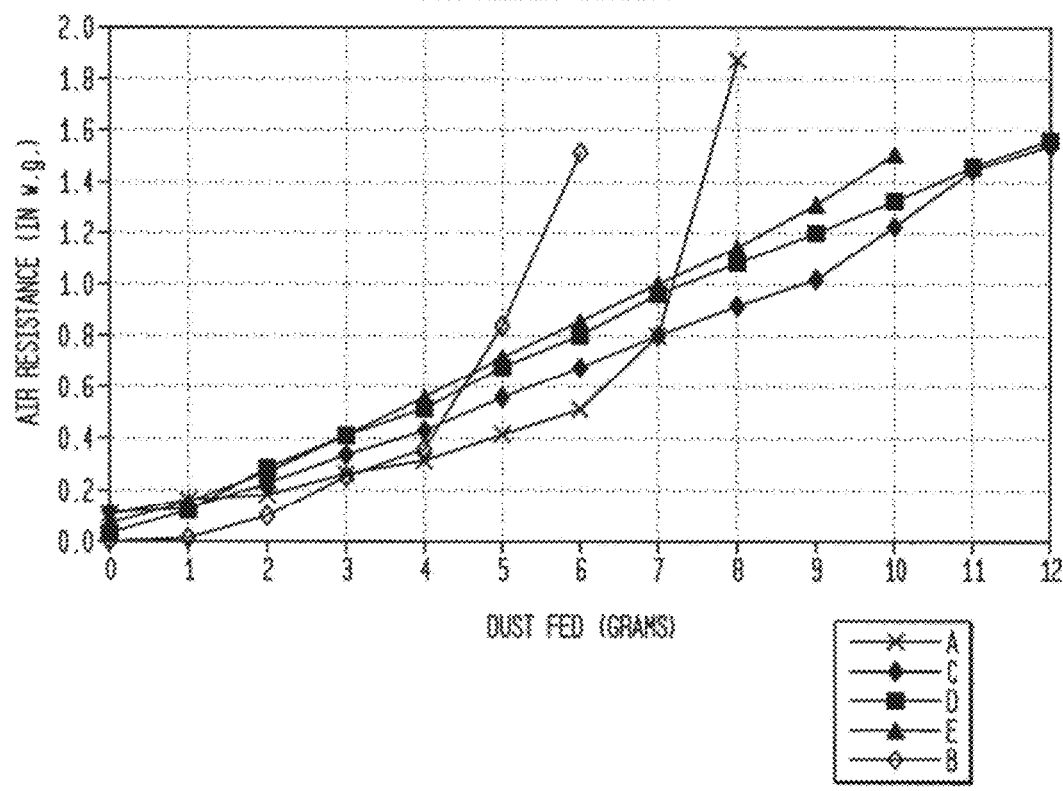

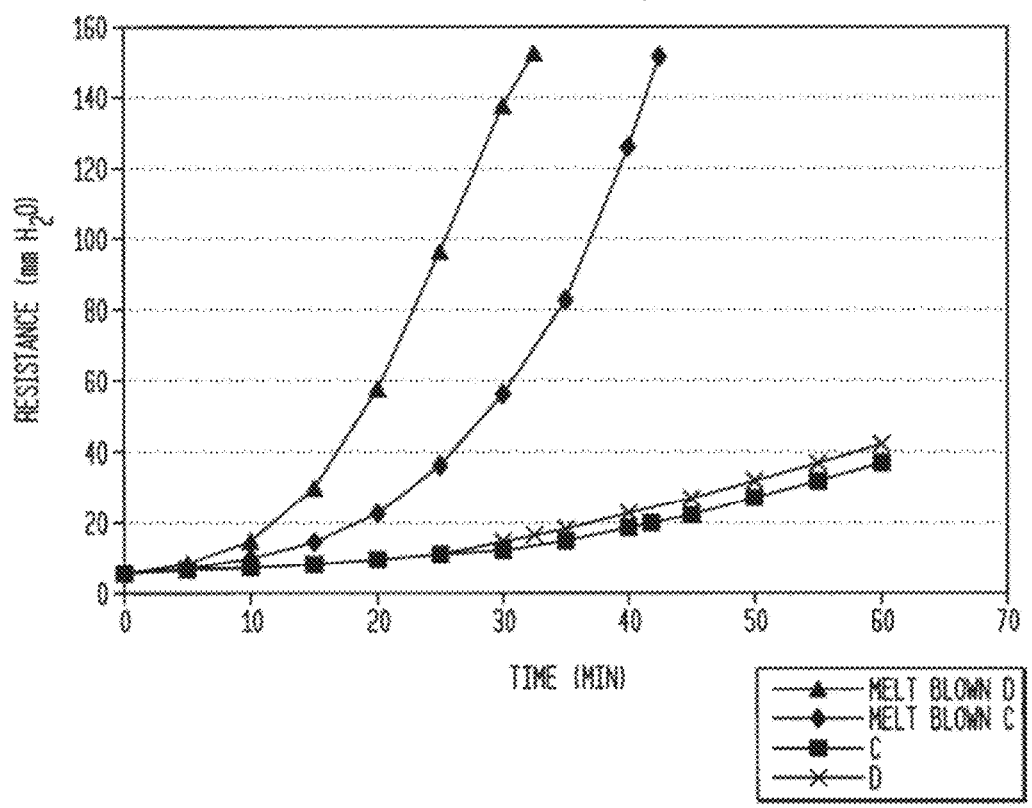

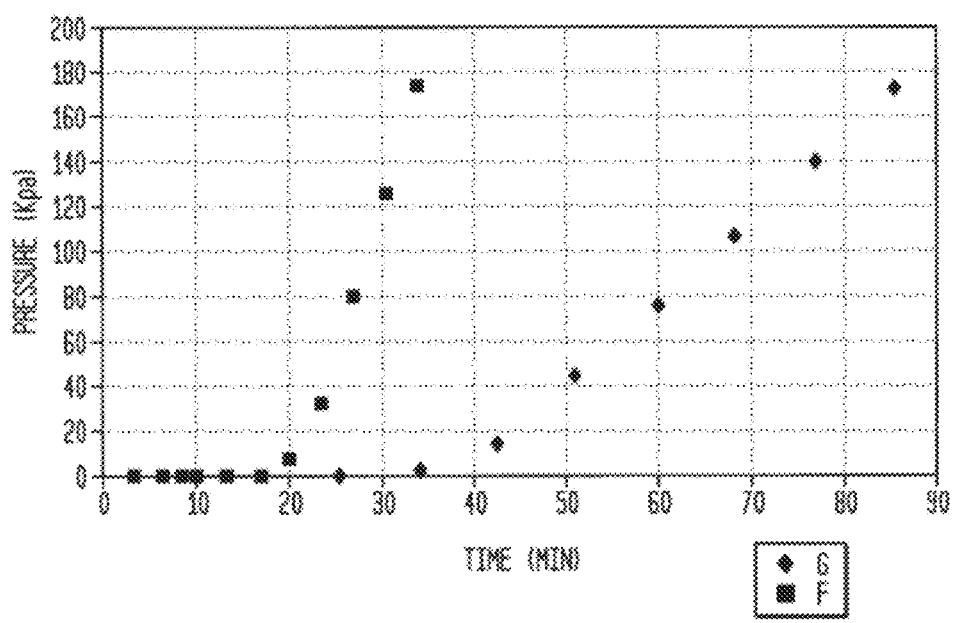

WAVED FILTER MEDIA AND ELEMENTS

CROSS REFERENCE TO RELATED APPLICATIONS

The present application is a continuation of U.S. patent application Ser. No. 12/508,770, filed on Jul. 24, 2009, which is a continuation-in-part of U.S. patent application Ser. No. 12/399,281, filed on Mar. 6, 2009, entitled "Waved Filter Media and Elements", which is a continuation-in-part of U.S. patent application Ser. No. 12/038,049, filed on Feb. 27, 2008 and entitled "Waved Filter Media and Elements", which claims priority to U.S. Provisional Application No. 60/986,626 filed on Nov. 9, 2007 and entitled "Waved Filter Media and Elements" and U.S. Provisional Application No. 60/892,025 filed on Feb. 28, 2007 and entitled "Curvilinear Filter Medium," which are all hereby incorporated by reference in their entireties.

FIELD OF THE INVENTION

The present invention relates to filtration, and more particularly to high capacity filter media and elements.

BACKGROUND OF THE INVENTION

The removal of air borne particulate contaminants from the air is a concern to everyone. Gas phase particulate filtration has traditionally been accomplished by methods that utilize woven or nonwoven fabrics or webs. The performance of such a system is characterized by the initial efficiency of removal or capture of the particulate as a function of particle size, the initial resistance of the system to air or gas flow as a function of gas flow rate or face velocity, and the way both of these factors change as the filter element loads with the particulate contaminant. One common measurement is the alpha value of a media, which is the product of the pressure drop and the filtration efficiency, and is calculated as follows:

$$\text{alpha} = -100 * \log((100 - \text{efficiency})/100)/\text{Pressure Drop.}$$

Generally, it is desirable that a particular filter media have a higher alpha value, as this is indicative that media has a low pressure drop and a high efficiency. For example, the glass materials that are used for ASHRAE bag filters have alpha values (obtained with a DOP challenge) that are in the range of 12-16 (depending upon the particular efficiency of the media), and are not reliant on any type of electrostatic charge to achieve this alpha value. Glass paper can have alpha values of about 12-13, membrane materials can have alpha values of about 20, and nanofiber electrospun materials can have alpha values in the range of about 5-12. None of these materials is reliant on any type of electrostatic charge to achieve these alpha values.

Filtration media formed from using meltblown, spunbond, carded nonwoven, and wet laid synthetic materials can have very high alpha values when they are electrostatically charged. However, when the charge is removed, the alpha values of these media significantly decreases to levels that are well below the alpha values of media made using other materials.

Accordingly, there remains a need to provide an improved filter, and more particularly to provide filter media and filter elements having improved alpha values, including those that can maintain high alpha values during use.

SUMMARY OF THE INVENTION

In one embodiment, a filter media is provided having a membrane filtration layer and a coarse support layer that holds the membrane filtration layer in a waved configuration and maintains separation of peaks and troughs of adjacent waves of the filtration layer.

In one embodiment, a filter media is provided having a fine fiber filtration layer and a coarse support layer that holds the fine fiber filtration layer in a waved configuration and maintains separation of peaks and troughs of adjacent waves of the filtration layer. The layers of the filter media, as well as the various properties of each layer can vary. In one embodiment, the coarse support layer has a fiber mass that is less at the peaks than a fiber mass in the troughs. In another embodiment, the fine fiber filtration layer can have a surface area that is at least 50%, and more preferably 100%, greater than a surface area of the fine fiber filtration layer in a planar configuration. In another embodiment, the coarse support layer can be a downstream coarse support layer, and the filter media can further include an upstream coarse support layer. The fine fiber filtration layer can be disposed between the upstream coarse support layer and the downstream coarse support layer. The filter media can also include at least one additional filtration layer disposed between the downstream coarse support layer and the upstream coarse support layer. In one exemplary embodiment, the at least one additional filtration layer can be formed from fibers having an average diameter greater than an average fiber diameter of fibers that form the fine fiber filtration layer.

The fiber diameters of the various layers can vary. In one embodiment, the upstream coarse support layer can be formed from fibers having an average diameter greater than an average diameter of fibers forming the fine fiber filtration layer and equal to or less than an average diameter of fibers forming the downstream coarse support layer. In an exemplary embodiment, the upstream coarse support layer, the fine fiber filtration layer, and the downstream coarse support layer all have a waved configuration. In some cases, one or more of the upstream coarse support layer, the fine fiber filtration layer, and the downstream coarse support layer are charged. In an exemplary embodiment, the filter media has about 2 to 6 waves per inch. The upstream and downstream coarse support layers can be formed from, for example, staple fiber layers, and the fine fiber filtration layer can be at least one of a meltblown layer and a glass fiber layer. The coarse support layer can also be formed from at least one binder fiber and at least one non-binder fiber.

In another embodiment, the filter media can include at least one of a planar layer disposed upstream of the upstream coarse support layer and a planar layer disposed downstream of the downstream coarse support layer. The planar layer can be formed from fibers having an average diameter less than an average diameter of fibers forming the upstream coarse support layer and the downstream coarse support layer, and greater than an average diameter of fibers forming the fine fiber filtration layer. In another embodiment, the planar layer can be formed from fibers having an average diameter that is greater than the upstream and downstream coarse support layers and the fine fiber filtration layer. In such an embodiment, the planar layer is preferably disposed downstream of the downstream coarse support layer.

The filter media can also have various properties. For example, the filter media can have a DOP alpha value of greater than about 9, and more preferably greater than about 11; a dust holding capacity of at least about 8 g/ft$^2$ at 25 FPM face velocity using ASHRAE dust loading to 1.5 inch H$_2$O pressure drop; a NaCl loading of less than about 50 mm H$_2$O after loading approximately 60 mg/100 cm$^2$ of 0.26 µm particles at 25 FPM face velocity; an air permeability in the range of about 10 CFM to 300 CFM; a basis weight in the range of about 70 gsm to 1100 gsm; and/or a thickness in the range of about 1.5 mm to 25 mm.

In yet another embodiment, a filter media is provided having a first fibrous layer with a waved configuration forming a plurality of waves, each wave having a random wave form and height, and each wave having a peak and a trough, adjacent peaks being spaced a distance apart from one another and adjacent troughs being spaced a distance apart from one another. The filter media can also include a second fibrous layer mated to the first fibrous layer and formed from fibers that are more coarse than fibers forming the first layer.

In one embodiment, the first fibrous layer can have a surface area that is at least about 50% greater, and more preferably 100% greater, than a surface area of the first fibrous layer in a planar configuration. The first fibrous layer can be formed from, for example, fine fibers having an average diameter less than an average diameter of fibers forming the second fibrous layer. The average diameter of the fibers of the first fibrous layer can be less than about 5 μm and the average diameter of the fibers of the second fibrous layer is greater than about 10. In another embodiment, the second fibrous layer can have a fiber density that is greater adjacent to the peaks of the first fibrous layer than the fiber density adjacent to the troughs of the first fibrous layer. The second fibrous layer can be disposed downstream of the first fibrous layer, and the filter media can also include a third fibrous layer disposed upstream of the first fibrous layer. In one exemplary embodiment, the third fibrous layer is formed from fibers having an average diameter that is equal to or less than an average diameter of fibers forming the second fibrous layer, and the diameter of the fibers forming the second fibrous layer is greater than an average diameter of fibers forming the first fibrous layer. The first, second, and third fibrous layers can have a waved configuration, and the filter media can also include at least one of a fourth layer disposed upstream of the third fibrous layer and having a planar configuration and a fifth layer disposed downstream of the second fibrous layer and having a planar configuration. In certain exemplary embodiments, the first fibrous layer is a meltblown layer or a glass fiber layer, and the second fibrous layer is formed from at least one binder fiber and at least one non-binder fiber.

In yet another embodiment, a multi-layer filter media is provided having a curvilinear web formed from a fine fiber layer and at least one coarse support layer formed from a blend of binder fibers and non-binder fibers. The at least one coarse support layer can maintain spacing between adjacent peaks of the fine fiber layer and maintain spacing between adjacent troughs of the fine fiber layer. The filter media can also include a planar web mated to the curvilinear web.

In one embodiment, the fine fiber layer can be a meltblown layer or a glass layer, and the at least one coarse support layer can be formed from at least one binder fiber and at least one non-binder fiber. The at least one coarse support layer can include a first coarse support layer disposed upstream of the fine fiber layer and a second coarse support layer disposed downstream of the fine fiber layer. The planar web can be disposed upstream of the first coarse support layer. In an exemplary embodiment, the second coarse support layer is formed from fibers having an average fiber diameter that is greater than an average fiber diameter of fibers forming the first coarse support layer, and the average fiber diameter of the fibers forming the second coarse support layer is greater than an average fiber diameter of the fibers forming planar web, and the average fiber diameter of the fibers forming the planar web is greater than an average fiber diameter of fibers forming the fine fiber layer. In other aspects, the fine fiber layer can have a surface area that is at least about 50% greater than a surface area of the fine fiber layer in a planar configuration.

In other aspects, a filter element is provided having a filter media with at least two fibrous layers having a waved configuration such that the filter media includes a plurality of non-uniform waves having a height that is about 2" or less. At least one of the fibrous layers can be a fine fiber filtration layer, such as a meltblown layer or a glass layer, and at least one of the fibrous layers can be a coarse fiber support layer. The filter element can also include a housing disposed around a perimeter of the filter media. In one embodiment, the housing can be formed by stiffening a portion of the perimeter of the filter media. In another embodiment, the housing can be a frame disposed around the perimeter of the filter media. The filter media preferably has a MERV rating of 7 to 16.

In another embodiment, a pleated filter element is provided having a filtration layer and a support layer mated together to form a waved filter media with a plurality of peaks and troughs. The waved filter media is pleated. In an exemplary embodiment, the waved filter media includes a stiff backing sufficient to allow the waved filter media to maintain pleats. Alternatively or in addition, the waved filter media can have a stiffness that allows the waved filter media to maintain pleats. In an exemplary embodiment, the waved filter media has a thickness, before pleating, of about 0.5" or less, and a thickness when pleated of about 12" or less, and more preferably about 2" or less. The pleated waved filter media can also include a housing disposed around a perimeter of the filter media. In an exemplary embodiment, the pleated filter media has MERV rating of 7 to 16.

In other aspects, a bag filter is provided having a housing and a plurality of filters mated to the housing. Each filter can have a pocket formed therein and can be configured to receive airflow therethrough, and each filter can be formed from a filter media having a first fibrous layer, such as a meltblown or glass layer, that is held in a waved configuration by a second fibrous layer to form peaks and troughs. The housing can be, for example, a frame and an open end of each filter can be mated to the frame. The filters can be positioned parallel to one another. The filters can also optionally include at least one spacer disposed therein and adapted to maintain opposed sidewalls of the filter at a predetermined distance apart from one another. In an exemplary embodiment, the filter media has a thickness that is about 2" or less, and more preferably about 0.5" or less, and/or a MERV rating in the range of about 7 to 16, and more preferably about 10 to 16. The filter media can also include a third fibrous layer disposed on a side of the first fibrous layer opposite to the second fibrous layer.

In one set of embodiments, a filter media includes a fine fiber filtration layer comprising a plurality of waves having peaks and troughs in a waved configuration, and a coarse support layer that holds the fine fiber filtration layer in the waved configuration and maintains separation of peaks and troughs of adjacent waves of the filtration layer. In one embodiment, the filter media has an initial DOP alpha value of greater than about 40. In another embodiment, the filter media has a DOP alpha value of greater than about 9 at 60 minutes. In yet another embodiment, the filter media has a pressure drop from NaCl loading of less than 30 mm $H_2O$ at 60 minutes. The fine fiber filtration layer in some such embodiments may be electrostatically charged, and may include, for example, fibers having an average diameter of about 5 μm or less, e.g., about 1.5 μm or less. Furthermore, the filter media may have an initial pressure drop of less than about 10.0 mm $H_2O$, or less than about 3.0 mm $H_2O$. For certain applications, the filter media has an initial DOP penetration of less than about 90% and a penetration at 60 minutes of DOP loading of less than about 95%, or an initial DOP penetration of less than about 30% and a penetration at 60 minutes of DOP loading of less than about 65%. The amplitude of the peaks and troughs may be between about 0.1" and about 4.0", between about 0.1" and about 1.0", or between about 0.1" and about 0.3". The frequency of the media can also vary. For example, the filter media may have 2 to 6 waves per inch, e.g., about 3 waves per inch. The filter media can be used in a variety of applications including, for example, facemasks and respirators.

BRIEF DESCRIPTION OF THE DRAWINGS

FIG. 6 is a chart showing discharged DOP penetration versus pressure drop for various filter media;

FIG. 7 is a chart showing dust holding capacity for various filter media;

FIG. 8 is a chart showing NaCl Loading for various filter media;

FIG. 9 is a chart showing a multi-pass liquid test for various filter media;

DETAILED DESCRIPTION OF THE INVENTION

Certain exemplary embodiments will now be described to provide an overall understanding of the principles of the structure, function, manufacture, and use of the devices and methods disclosed herein. Those skilled in the art will understand that the devices and methods specifically described herein are non-limiting exemplary embodiments and that the scope of the present invention is defined solely by the claims. The features described in connection with one exemplary embodiment may be combined with the features of other embodiments. Such modifications and variations are intended to be included within the scope of the present invention.

The present invention generally provides various high performance, high efficiency filter media that are cost effective and easy to manufacture. In particular, various filter media are provided having at least one layer with a waved configuration that results in an increased surface area, thereby enhancing various properties of the filter media. The filter media may optionally be charged and can be used to form a variety of filter elements for use in various applications.

Media

In general, various filter media are provided having at least one filtration (e.g., fibrous, membrane) layer that is held in a waved or curvilinear configuration by one or more additional layers (e.g., fibrous). As a result of the waved configuration, the filter media has an increased surface area which results in improved filtration properties. The filter media can include various layers, and only some or all of the layers can be waved.

Figure 1A:
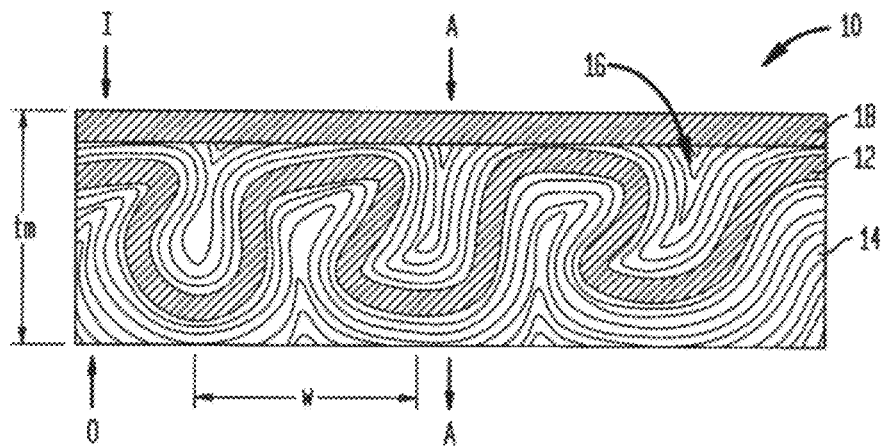
FIG. 1A is a side view illustration of one embodiment of a filter media.

FIG. 1A illustrates one exemplary embodiment of a filter media 10 having at least one filtration layer and at least one coarse support layer that holds the filtration layer in a waved configuration to maintain separation of peaks and troughs of adjacent waves of the filtration layer. The filtration layer(s) may be charged or uncharged. In the illustrated embodiment, the filter media 10 includes a fine fiber filtration layer 12, a first, downstream coarse support layer 14, and a second, upstream coarse support layer 16 disposed on opposite sides of the fine fiber filtration layer 12. The support layers 14, 16 can help maintain the fine fiber filtration layer 12, and optionally any additional filtration layers, in the waved configuration. While two coarse support layers 14, 16 are shown, the filter media 10 need not include both support layers. Where only one coarse support layer is provided, the coarse support layer can be disposed upstream or downstream of the filtration layer(s). One or more of the coarse support layer(s) may be charged in certain embodiments.

The filter media 10 can also optionally include one or more outer or cover layers located on the upstream-most and/or downstream-most sides of the filter media 10. FIG. 1A illustrates a top layer 18 disposed on the upstream side of the filter media 10 to function as an upstream dust holding layer. The top layer 18 can also function as an aesthetic layer, which will be discussed in more detail below. The layers in the illustrated embodiment are arranged so that the top layer 18 is disposed on the air entering side, labeled I, the second coarse support layer 16 is just downstream of the top layer 18, the fine fiber filtration layer 12 is disposed just downstream of the second coarse support layer 16, and the first coarse support layer 14 is disposed downstream of the first layer 12 on the air outflow side, labeled O. The direction of air flow, i.e., from air entering I to air outflow O, is indicated by the arrows marked with reference A.

Figure 1B:
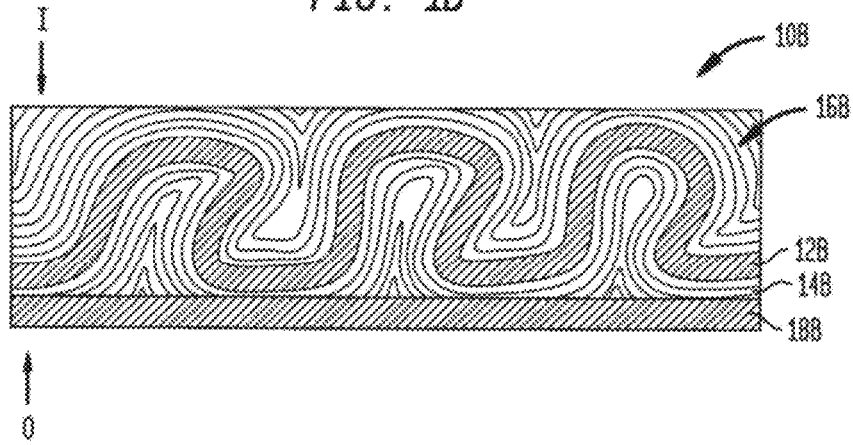
FIG. 1B is a side view illustration of another embodiment of a filter media.

The outer or cover layer can alternatively or additionally be a bottom layer disposed on the downstream side of the filter media 10 to function as a strengthening component that provides structural integrity to the filter media 10 to help maintain the waved configuration. The outer or cover layer(s) can also function to offer abrasion resistance. FIG. 1B illustrates another embodiment of a filter media 10B that is similar to filter media 10 of FIG. 1B. In this embodiment, the filter media 10B does not include a top layer, but rather has a fine fiber filtration layer 12B, a first coarse support layer 14B disposed just downstream of the fine fiber filtration layer 12B, a second coarse support layer 16B disposed just upstream of the fine fiber filtration layer 12B on the air entering side I, and a bottom layer 18B disposed just downstream of the first coarse support layer 14B on the air exiting side O. Furthermore, as shown in the exemplary embodiments of FIGS. 1A and 1B, the outer or cover layer(s) can have a topography different from the topographies of the fine fiber filtration layer and/or any coarse support layers. For example, in either a pleated or non-pleated configuration, the outer or cover layer(s) may be non-waved (e.g., substantially planar), whereas the fine fiber filtration layer and/or any coarse support layers may have a waved configuration. A person skilled in the art will appreciate that a variety of other configurations are possible, and that the filter media can include any number of layers in various arrangements.

Fine Fiber Layer

As indicated above, in an exemplary embodiment the filter media 10 includes at least one fine fiber filtration layer 12, which may optionally be charged. In an exemplary embodiment, a single filtration layer 12 formed from fine fibers is used, however the filter media 10 can include any number of additional optionally charged filtration layers disposed between the downstream coarse support layer and the upstream coarse support layer, adjacent to the fine fiber filtration layer 12, or disposed elsewhere within the filter media. While not shown, the additional filtration layer(s) can be maintained in a waved configuration with the fine fiber filtration layer 12. In certain exemplary embodiment the filter media 10 can include one or more additional filtration layers disposed upstream of the fine fiber filtration layer 12. The additional filtration layer(s) can be formed from fine fibers, or more preferably can be formed from fibers having an average fiber diameter that is greater than an average fiber diameter of the fibers that form the fine fiber filtration layer 12.

The fine fiber filtration layer 12 can be formed from a variety of fibers, but in an exemplary embodiment the fine fiber filtration layer 12 is formed from fibers having an average fiber diameter that is less than about 10 µm, and more preferably that is less than about 5 µm, and more preferably that is less than about 3 µm. In certain exemplary embodiments, the fibers can have an average fiber diameter of about 1.5 µm or less, including nanofibers having an average diameter of less than about 1 µm, e.g., about 0.5 µm. In some embodiments, the fibers have an average fiber diameter of between about 0.3 µm and about 1.5 µm, or between about 0.3 µm and about 1.0 µm.

If provided, any additional filtration layers can likewise be formed from a variety of fibers, but in an exemplary embodiment the additional filtration layer(s) is/are formed from fibers having an average fiber diameter that is greater than about 5 µm but preferably that is less than about 10 µm.

Various materials can also be used to form the fibers, including synthetic and non-synthetic materials. In one exemplary embodiment, the fine fiber filtration layer 12, and any additional filtration layer(s), is formed from meltblown fibers. Exemplary materials include, by way of non-limiting example, polyolefins, such as polypropylene and polyethylene; polyesters, such as polybutylene terephthalate and polyethylene terephthalate; polyamides, such as Nylon; polycarbonate; polyphenylene sulfide; polystyrene; and polyurethane. In another embodiment, the fine fiber filtration layer 12 can be formed from glass fibers. Various manufacturing techniques can be used to form the glass fiber web, include wetlaid or drylaid webs. The type and size of glass fiber can also vary, but in an exemplary embodiment, the fiber is a microglass fiber, such as A-type or E-type glass fibers made using a rotary or flame attenuation process and having an average fiber diameter in the range of about 0.2 µm to 5 µm. However, other suitable materials include, by way of non-limiting example, polyvinyl alcohol and polyvinylidene fluoride. The fine fiber filtration layer 12, and any additional filtration layer(s), can also be formed using various other techniques known in the art, including wet laid techniques, air laid techniques, carding, electrospinning, and spunbonding. In embodiments in which the fine fiber filtration layer is charged, the layer may be charged prior to joining with another layer, or after a composite of two or more layers has been formed.

The resulting fine fiber filtration layer 12, as well as any additional filtration layer(s), can also have a variety of thicknesses, air permeabilities, basis weights, and filtration efficiencies depending upon the requirements of a desired application. In one exemplary embodiment, the fine fiber filtration layer 12, as measured in a planar configuration, has a thickness in the range of about 0.1 mils to 30 mils; for example, between about 0.1 mils to 2 mils, or between about 2 mils to 12 mils. The fine fiber filtration layer may have an air permeability in the range of about 10 CFM to 1000 CFM. For example, the permeability may be between about 10 CFM to 300 CFM, or between about 600 CFM to 700 CFM. The basis weight may be in the range of about 0.1 gsm to 50 gsm, for example, between about 5 gsm to 40 gsm. The DOP filtration efficiency of the fine fiber filtration layer may vary widely depending on the particular application, but is generally in the range of about 20% to 99.999%. For example, for certain applications, the fine DOP efficiency may be between about 95 to 99.999%. If any additional filtration layers are provided, in certain exemplary embodiments each additional filtration layer, as measured in a planar configuration, has a thickness in the range of about 0.1 mils to 30 mils, an air permeability in the range of about 10 CFM to 1000 CFM, a basis weight in the range of about 0.1 gsm to 50 gsm, and a DOP filtration efficiency in the range of about 20% to 99.999%. It should be understood, however, that the ranges described herein are exemplary and that certain embodiments may include values that fall outside of these ranges.

Membrane Layer

In some embodiments, the filter media 10 may include at least one membrane layer that is formed in a waved configuration. In these embodiments, the membrane layer(s) may function as the filtration layer. Similarly to that described above for the fine fiber filtration layer, the membrane layer may be incorporated into the filter media between coarse support layers. It should be understood that though the description herein generally focuses on filter media that include a fine fiber filtration layer, the description also applies to filter media that include a membrane filtration layer. For example, in the embodiment shown in FIG. 1A, the filtration layer 12 may be a membrane filtration layer rather than a fine fiber filtration layer as described above.

In some embodiments, filter media that include a filtration membrane layer in a waved configuration may not include any fine fiber filtration layers in a waved configuration. In some embodiments, one or more membrane layers may be incorporated in a filter media in a waved configuration along with one or more fine fiber layers. For example, a membrane layer may be layered on or together with a fine fiber layer. It should be understood that the filter media may include any number of additional filtration layers (which may be either membrane or fine fiber) disposed between the downstream coarse support layer and the upstream coarse support layer.

In general, any suitable material may be used to form the membrane layer. Suitable materials include polytetrafluoroethylene (PTFE) (e.g., expanded or unexpanded), polyethylene (e.g., linear low density, ultra high molecular weight), polypropylene, polycarbonate, polyester, nitrocellulose-mixed esters, polyethersulfone, cellulose acetate, polyimide, cellulose acetate, polyvinylidene fluoride, polyacrylonitrile, polysulfone, polyethersulfone, and polyamide, amongst others. In some embodiments, PTFE membranes may be preferred.

The membrane layer may be a single layer film or a multilayer film. In embodiments which use multilayer films, the different layers may have different compositions. In general, the membrane layer may be formed by suitable methods that are known in the art.

The membrane layer has a plurality of pores. The pores permit the fluid to pass through while contamination particles are captured on the membrane.

Coarse Support Layers

As also indicated above, the filter media 10 can include at least one coarse fibrous support layer, which may optionally be charged. In an exemplary embodiment, the filter media 10 includes a downstream coarse support layer 14 disposed on the air outflow side O of the fine fiber filtration layer 12 and that is effective to hold the fine fiber filtration layer 12 in the waved configuration. The filter media 10 can also include an upstream coarse support layer 16 that is disposed on the air entering side I of the fine fiber filtration layer 12 opposite to the downstream coarse support layer 14. The upstream coarse support layer 16 can likewise help maintain the fine fiber filtration layer 12 in a waved configuration. As indicated above, a person skilled in the art will appreciate that the filter media 10 can include any number of layers, and it need not include two coarse support layers, or a top layer. In certain exemplary embodiments, the filter media 10 can be formed from a fine fiber filtration layer 12 and a single, adjacent coarse support layer 14 or 16. In other embodiments, the filter media can include any number of additional layers arranged in various configurations. The particular number and type of layers will depend on the intended use of the filter media.

The coarse support layers 14, 16 can be formed from a variety of fibers types and sizes. In an exemplary embodiment, the downstream coarse support layer 14 is formed from fibers having an average fiber diameter that is greater than an average fiber diameter of the fine fiber filtration layer 12, the upstream coarse support layer 16, and the top layer 18, if provided, and the upstream coarse support layer 16 is formed from fibers having an average fiber diameter that is less than an average fiber diameter of the downstream coarse support layer 14, but that is greater than an average fiber diameter of the fine fiber filtration layer 12 and the top layer 18. In certain exemplary embodiments, the downstream coarse support layer 14 can be formed from fibers having an average fiber diameter in the range of about 5 µm to 40 µm, and more preferably that is in the range of about 20 µm to 30 µm or about 10 µm to 20 µm, and the upstream coarse support layer 16 can be formed from fibers having an average fiber diameter that is in the range of about 10 µm to 40 µm, and more preferably that is in the range of about 15 µm to 20 µm or about 10 µm to 20 µm.

Various materials can also be used to form the fibers of the coarse support layers 14, 16, including synthetic and non-synthetic materials. In one exemplary embodiment, the coarse support layers 14, 16 are formed from staple fibers, and in particular from a combination of binder fibers and non-binder fibers. One suitable fiber composition is a blend of at least about 20% binder fiber and a balance of non-binder fiber.

A variety of types of binder and non-binder fibers can be used to form the media of the present invention. The binder fibers can be formed from any material that is effective to facilitate thermal bonding between the layers, and will thus have an activation temperature that is lower than the melting temperature of the non-binder fibers. The binder fibers can be mono-component fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This is particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers. Exemplary bi-component binder fibers can include Trevira Types 254, 255, and 256; Invista Cellbond® Type 255; Fiber Innovations Types 201, 202, 215, and 252; and ES Fibervisions AL-Adhesion-C ESC 806A.

The non-binder fibers can be synthetic and/or non-synthetic, and in an exemplary embodiment the non-binder fibers can be about 100 percent synthetic. In general, synthetic fibers are preferred over non-synthetic fibers for resistance to moisture, heat, long-term aging, and microbiological degradation. Exemplary synthetic non-binder fibers can include polyesters, acrylics, polyolefins, nylons, rayons, and combinations thereof. Alternatively, the non-binder fibers used to form the media can include non-synthetic fibers such as glass fibers, glass wool fibers, cellulose pulp fibers, such as wood pulp fibers, and combinations thereof. Exemplary synthetic non-binder fibers can include Trevira Type 290 and Wellman Fortrel® Types 204, 289 and 510.

The coarse support layers 14, 16 can also be formed using various techniques known in the art, including meltblowing, wet laid techniques, air laid techniques, carding, electrospinning, and spunbonding. In an exemplary embodiment, however, the coarse support layers 14, 16 are carded or airlaid webs. The resulting layers 14, 16 can also have a variety of thicknesses, air permeabilities, and basis weights depending upon the requirements of a desired application. In one exemplary embodiment, the downstream coarse support layer 14 and the upstream coarse support layer 16, as measured in a planar configuration, each have a thickness in the range of about 10 mil to 60 mil, an air permeability in the range of about 300 CFM to 1000 CFM, and a basis weight in the range of about 10 gsm to 100 gsm.

Outer Or Cover Layer

As previously indicated, the filter media 10 can also optionally include one or more outer or cover layers disposed on the air entering side I and/or the air outflow side O. FIG. 1A illustrates a top layer 18 disposed on the air entering side I of the filter media 10. The top layer 18 can function as a dust loading layer and/or it can function as an aesthetic layer. In an exemplary embodiment, the top layer 18 is a planar layer that is mated to the filter media 10 after the fine fiber filtration layer 12 and the coarse support layers 14, 16 are waved. The top layer 18 thus provides a top surface that is aesthetically pleasing. The top layer 18 can be formed from a variety of fiber types and sizes, but in an exemplary embodiment the top layer 18 is formed from fibers having an average fiber diameter that is less than an average fiber diameter of the upstream coarse support layer 16 disposed immediately downstream of the top layer 18, but that is greater than an average fiber diameter of the fine fiber filtration layer 12. In certain exemplary embodiments, the top layer 18 is formed from fibers having an average fiber diameter in the range of about 5 μm to 20 μm. As a result, the top layer 18 can function as a dust holding layer without affecting the alpha value of the filter media 10, as will be discussed in more detail below.

As shown in FIG. 1B, the filter media 10B can alternatively or in addition include a bottom layer 18B disposed on the air outflow side O of the filter media 10B. The bottom layer 18B can function as strengthening component that provides structural integrity to the filter media 10B to help maintain the waved configuration. The bottom layer 18B can also function to offer abrasion resistance. This is particularly desirable in ASHRAE bag applications where the outermost layer is subject to abrasion during use. The bottom layer 18B can have a configuration similar to the top layer 18, as discussed above. In an exemplary embodiment, however, the bottom layer 18B is preferably the coarsest layer, i.e., it is formed from fibers having an average fiber diameter that is greater than an average fiber diameter of fibers forming all of the other layers of the filter media. One exemplary bottom layer is a spunbond layer, however various other layers can be used having various configurations.

Various materials can also be used to form the fibers of the outer or cover layer, including synthetic and non-synthetic materials. In one exemplary embodiment, the outer or cover layer, e.g., top layer 18 and/or bottom layer 18B, is formed from staple fibers, and in particular from a combination of binder fibers and non-binder fibers. One suitable fiber composition is a blend of at least about 20% binder fiber and a balance of non-binder fiber. A variety of types of binder and non-binder fibers can be used to form the media of the present invention, including those previously discussed above with respect to the coarse support layers 14, 16.

The outer or cover layer, e.g., top layer 18 and/or any bottom layer, can also be formed using various techniques known in the art, including meltblowing, wet laid techniques, air laid techniques, carding, electrospinning, and spunbonding. In an exemplary embodiment, however, the top layer 18 is an airlaid layer and the bottom layer 18B is a spunbond layer. The resulting layer can also have a variety of thicknesses, air permeabilities, and basis weights depending upon the requirements of a desired application. In one exemplary embodiment, the outer or cover layer, as measured in a planar configuration, has a thickness in the range of about 2 mil to 50 mil, an air permeability in the range of about 100 CFM to 1200 CFM, and a basis weight in the range of about 10 gsm to 50 gsm.

A person skilled in the art will appreciate that, while FIG. 1A illustrates a four layer filter media, the media can include any number of layers in various configurations. Various layers can be added to enhance filtration, to provide support, to alter structure, or for various other purposes. By way of non-limiting example, the filter media can include various spunbond wetlaid cellulose, drylaid synthetic nonwoven, wetlaid synthetic, and wetlaid microglass layers.

Method of Manufacturing

Some or all of the layers can be formed into a waved configuration using various manufacturing techniques, but in an exemplary embodiment the filtration layer 12 (e.g., fine fiber, membrane), any additional filtration layers, and preferably at least one of the coarse support layers 14, 16, are positioned adjacent to one another in a desired arrangement from air entering side to air outflow side, and the combined layers are conveyed between first and second moving surfaces that are traveling at different speeds, such as with the second surface traveling at a speed that is slower than the speed of the first surface. A suction force, such as a vacuum force, can be used to pull the layers toward the first moving surface, and then toward the second moving surface as the layers travel from the first to the second moving surfaces. The speed difference causes the layers to form z-direction waves as they pass onto the second moving surface, thus forming peaks and troughs in the layers. The speed of each surface can be altered to obtain the desired number of waves per inch. The distance between the surfaces can also be altered to determine the amplitude of the peaks and troughs, and in an exemplary embodiment the distance is adjusted between 0.025" to 4". For example, the amplitude of the peaks and waves may be between about 0.1" to 4.0", e.g., between about 0.1" to 1.0", between about 0.1" to 2.0", or between about 3.0" to 4.0". For certain applications, the amplitude of the peaks and waves may be between about 0.1" and 1.0", between about 0.1" and 0.5", or between about 0.1" and 0.3". The properties of the different layers can also be altered to obtain a desired filter media configuration. In an exemplary embodiment the filter media has about 2 to 6 waves per inch, with a height (overall thickness) in the range of about 0.025" to 2", however this can vary significantly depending on the intended application. For instance, in other embodiments, the filter media may have about 2 to 4 waves per inch, e.g., about 3 waves per inch. The overall thickness of the media may be between about 0.025" to 4.0", e.g., between about 0.1" to 1.0", between about 0.1" to 2.0" or between about 3.0" to 4.0". For certain applications, the overall thickness of the media may be between about 0.1" and 0.5", or between about 0.1" and 0.3". As shown in FIG. 1A, a single wave W extends from the middle of one peak to the middle of an adjacent peak.

Figure 1C:
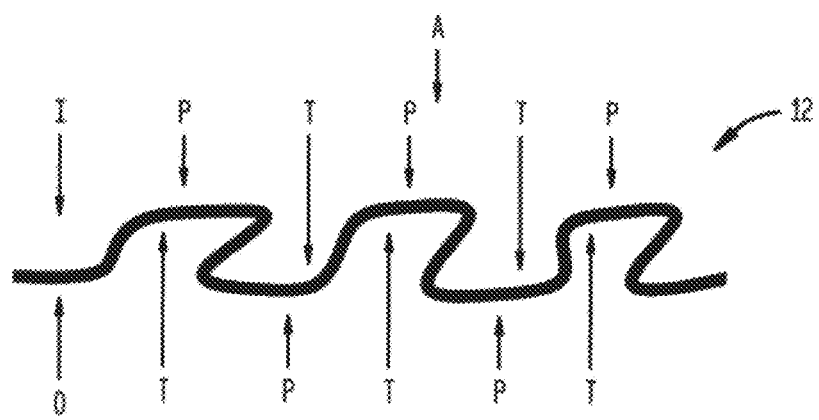
FIG. 1C is a side view illustration of one layer of the filter media of FIG. 1A.

In the embodiment shown in FIG. 1A, when the fine fiber filtration layer 12 and the coarse support layers 14, 16 are waved, the resulting fine fiber filtration layer 12 will have a plurality of peaks P and troughs T on each surface (i.e., air entering side I and air outflow side O) thereof, as shown in FIG. 1C. The coarse support layers 14, 16 will extend across the peaks P and into the troughs T so that the coarse support layers 14, 16 also have waved configurations. A person skilled in the art will appreciate that a peak P on the air entering side I of the fine fiber filtration layer 12 will have a corresponding trough T on the air outflow side O. Thus, the downstream coarse support layer 14 will extend into a trough T, and exactly opposite that same trough T is a peak P, across which the upstream coarse support layer 16 will extend. Since the downstream coarse support layer 14 extends into the troughs T on the air outflow side O of the fine fiber filtration layer 12, the downstream coarse layer 14 will maintain adjacent peaks P on the air outflow side O at a distance apart from one another and will maintain adjacent troughs T on the air outflow side O at a distance apart from one another. The upstream coarse support layer 16, if provided, can likewise maintain adjacent peaks P on the air entering side I of the fine fiber filtration layer 12 at a distance apart from one another and can maintain adjacent troughs T on the air entry side I of the fine fiber filtration layer 12 at a distance apart from one another. As a result, the fine fiber filtration layer 12 has a surface area that is significantly increased, as compared to a surface area of the fine fiber filtration layer in the planar configuration. In certain exemplary embodiments, the surface area in the waved configuration is increased by at least about 50%, and in some instances as much as 120%, as compared to the surface area of the same layer in a planar configuration. The increased surface area leads to an increased filtration efficiency, as will be discussed in more detail below.

In embodiments in which the upstream and/or downstream coarse support layers hold the fine fiber filtration layer in a waved configuration, it may be desirable to reduce the amount of free volume (e.g., volume that is unoccupied by any fibers) in the troughs. That is, a relatively high percentage of the volume in the troughs may be occupied by the coarse support layer(s) to give the fine fiber layer structural support. For example, at least 95% or substantially all of the available volume in the troughs may be filled with the coarse support layer and the course support layer may have a solidity ranging between about 1% to 90%, between about 1% to 50%, between about 10% to 50%, or between about 20% to 50%. Additionally, as shown in the exemplary embodiments of FIG. 1A, the extension of the coarse support layer(s) across the peaks and into the troughs may be such that the surface area of the coarse support layer in contact with a top layer 18A is similar across the peaks as it is across the troughs. Similarly, the surface area of the coarse support layer in contact with a bottom layer 18B (FIG. 1B) may be similar across the peaks as it is across the troughs. For example, the surface area of the coarse support layer in contact with a top or bottom layer across a peak may differ from the surface area of the coarse support layer in contact with the top or bottom layer across a trough by less than about 70%, less than about 50%, less than about 30%, less than about 20%, less than about 10%, or less than about 5%.

In certain exemplary embodiments, the downstream and/or upstream coarse support layers 14, 16 can have a fiber density that is greater at the peaks than it is in the troughs, and a fiber mass that is less at the peaks than it is in the troughs. This can result from the coarseness of the downstream and/or upstream coarse support layers 14, 16 relative to the fine fiber filtration layer 12. In particular, as the layers are passed from the first moving surface to the second moving surface, the relatively fine nature of the fine fiber filtration layer 12 will allow the downstream and/or upstream coarse support layers 14, 16 to conform around the waves formed in the fine fiber filtration layer 12. As the coarse support layers 14, 16 extend across a peak P, the distance traveled will be less than the distance that each layer 14, 16 travels to fill a trough. As a result, the coarse support layers 14, 16 will compact at the peaks, thus having an increased fiber density at the peaks as compared to the troughs, through which the layers will travel to form a loop-shaped configuration.

Once the layers are formed into a waved configuration, the waved shape can be maintained by activating the binder fibers to effect bonding of the fibers. A variety of techniques can be used to activate the binder fibers. For example, if bicomponent binder fibers having a core and sheath are used, the binder fibers can be activated upon the application of heat. If monocomponent binder fibers are used, the binder fibers can be activated upon the application of heat, steam and/or some other form of warm moisture. A top layer 18 (FIG. 1A) and/or bottom layer 18B (FIG. 1B) can also be positioned on top of the upstream coarse support layer 16 (FIG. 1A) or on the bottom of the downstream coarse support layer 14B (FIG. 1B), respectively, and mated, such as by bonding, to the upstream coarse support layer 16 or downstream coarse support layer 14B simultaneously or subsequently. A person skilled in the art will also appreciate that the layers can optionally be mated to one another using various techniques other than using binder fibers. Other suitable mating techniques include adhesives, needling, hydroentanglement, and chemical binders. The layers can also be individually bonded layers, and/or they can be mated, including bonded, to one another prior to being waved.

A saturant can also optionally be applied to the material prior to drying the material. A variety of saturants can be used with the media of the present invention to facilitate the forming of the layers at a temperature that is less than the melting temperature of the fibers. Exemplary saturants can include phenolic resins, melamine resins, urea resins, epoxy resins, polyacrylate esters, polystyrene/acrylates, polyvinyl chlorides, polyethylene/vinyl chlorides, polyvinyl acetates, polyvinyl alcohols, and combinations and copolymers thereof that are present in an aqueous or organic solvent.

In other embodiments, the resulting media can also have a gradient in at least one, and optionally all, of the following properties: binder and non-binder fibers composition, fiber diameter, solidity, basis weight, and saturant content. For example, in one embodiment, the media can have a lightweight, lofty, coarse-fibered, lightly bonded and lightly saturated sheet upstream, and a heavier, denser, fine-fibered, heavily bonded and heavily saturated sheet downstream. This allows the coarser particles to be trapped in the upstream layer, preventing early saturation of the bottom layer. In other embodiments, the upstream-most layer can be lighter and/or loftier than the downstream-most layer. That is, the upstream layer can have a solidity (e.g., the solid volume fraction of fibers in the web) and a basis weight that is less than that of the downstream layer. Additionally, in embodiments where the filter media includes a saturant, the media can have a gradient with respect to the amount of saturant in the upstream-most and downstream-most layers. One skilled in the art will appreciate the variety of properties that the layers of the media can have.

An electrostatic charge can also optionally be imparted to the filter media, or to various layers of the media, to form an electret fiber web. For example, a charge may be imparted to a fine fiber filtration layer prior to joining with one or more coarse support layers. In another embodiment, a charge is imparted to a filter media including more than one layer, e.g., a fine fiber filtration layer and one or more coarse support layers. Depending on the materials used to form each of the layers, the amount of charge, and the method of charging, the charge may either remain in one or more of the layers or dissipate after a short period of time (e.g., within hours). A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. Charging can also be accomplished using other techniques, including friction-based charging techniques.

The filter media can also be pleated after it is formed into the waved configuration, and various exemplary configurations will be discussed in more detail below. A person skilled in the art will appreciate that virtually any pleating technique known in the art can be used to pleat the waved filter media. Typically, a filter media is pleated by forming a plurality of parallel score lines in the media and forming folds at each score line.

Filter Media Properties

As indicated above, the properties of the resulting filter media can vary depending on the configuration of the media and the intended use. In an exemplary embodiment, the waved configuration is effective to increase the surface area of the media 10, which in turn results in the media having improved filtration properties than an otherwise similar media that has a planar configuration. Furthermore, charging of the waved media may improve certain filtration properties compared to uncharged waved media in certain embodiments.

While filter performance can be evaluated based on different criteria, it is desirable that filters, or filter media, be characterized by low penetration across the filter of contaminants to be filtered. At the same time, however, there should exist a relatively low pressure drop, or resistance, across the filter. Penetration, often expressed as a percentage, is defined as follows:

$$Pen=C/C_0$$

where C is the particle concentration after passage through the filter and $C_0$ is the particle concentration before passage through the filter. Filter efficiency is defined as 100−% Penetration.

Because it is desirable for effective filters to maintain values as low as possible for both penetration and pressure drop across the filter, filters are rated according to a value termed alpha (α), which is the slope of log penetration versus pressure drop across the filter. Steeper slopes, or higher alpha values, are indicative of better filter performance. Alpha is expressed according to the following formula $$\alpha=-100\log(C/C_0)/DP,$$

where DP is the pressure drop across the filter media.

In many filtering situations it is important to have a high initial alpha value. However, it is equally, if not more important, to maintain acceptable alpha values well into the filtration process. For example, in respiratory applications, manufacturing standards mandate that the final respiratory filter, such as a respiratory mask, be subjected to elevated temperatures to simulate an aged effect. Accordingly, the filter media must be capable of maintaining a high alpha value when subjected to heat.

In certain applications, such as HVAC, discharged performance is also important. Synthetic filter media are often charged in order to enhance the filtration performance. Due to concerns that this charge will dissipate during the use of the filter, there is a movement to inform users of a filter's worst possible efficiency. EN779:2002, the European standard for coarse and fine filters, contains a mandatory test on flat piece media before and after discharging to determine whether there is a potential for performance degradation. The test method can be used with any procedure that results in a completely discharge media. Procedures suggested include immersion in isopropanol or surfactants in water or exposure to diesel fumes. Treatment with isopropanol is performed by first measuring the efficiency of untreated media samples. Next, the samples are immersed in a 100% solution of isopropanol, and after the filter samples have been wetted by isopropanol they are placed on a flat, inert surface in a fume cupboard for drying. After a drying period of 24 hours, the efficiency measurements are repeated.

The DOP (dioctyl phthalate) challenge employs an automated filter testing unit (8130) purchased from TSI, Inc. equipped with an oil generator. The instrument measures pressure drop across filter media and the resultant penetration value on an instantaneous or "loading" basis at a flow rate less than or equal to 115 liters per minute. Instantaneous readings are defined as 1 pressure drop/penetration measurement. According to TSI specifications, the oil generator produces a 0.33 micron mass mean diameter 0.20 micron count mean diameter with DOP, DEHS paraffin, or Emory 3004. All references herein to DOP alpha refer to a DOP challenge applied to a sample size of 100 $cm^2$. The air flow rate was 32 lpm to produce a 10.5 fpm face velocity or 76 lpm to produce a 25 fpm face velocity.

Another exemplary test is the NaCl (sodium chloride) challenge, which employs an 8130 CertiTest™ automated filter testing unit from TSI, Inc. equipped with a sodium chloride generator. The average particle size created by the salt particle generator is 0.26 micron mass mean diameter or 0.07 micron count mean diameter. The instrument measures a pressure drop across the filter media and the resultant penetration value on an instantaneous basis at a flow rate less than or equal to 115 liters per minute (lpm). The 8130 can be run in a continuous mode with one pressure drop/penetration reading approximately every minute. All references herein to NaCl alpha refer to a continuous loading of NaCl particles, to represent fine particle loading of a filter, onto a 100 $cm^2$ sample at a flow rate of 76 lpm (face velocity of 25 fpm). The sample was loaded for a period of 60 minutes at a concentration of 15 mg NaCl/$m^3$ air for a loading of approximately 60 mg NaCl per 100 $cm^2$ sample.

Glass media which meets EN779 classification of F5 to F8 is found to have an alpha value in the range of about 12 to 16 with DOP or DEHS (dioctyl sebacate, an accepted equivalent to DOP) when tested at a face velocity of 5.3 cm/s before and after discharging using isopropyl alcohol, as explained above. Certain media of the present invention achieve a minimum DOP alpha of 9, and more preferably greater than about 11, and most preferably greater than 16, after discharging using isopropyl alcohol, thus providing a suitable alternative to glass media. For a DOP alpha of 9, the equivalent NaCl alpha after IPA soak is about 12, for a DOP alpha of 11, the equivalent NaCl alpha after IPA soak is about 14, and for a DOP alpha of 16 the equivalent NaCl alpha after IPA soak is about 20. However, the alpha value of the filter media in accordance with the present invention may vary depending on the particular configuration of the filter media, or the filter element containing the filter media.

As described herein, certain filter media may include a fine fiber filtration layer, and optionally one or more coarse support layers, having a plurality of peaks and troughs in a waved configuration. The fine fiber filtration layer, and optionally the one or more coarse support layers, may be charged. In some embodiments, such filter media have high DOP alpha values. For instance, a filter media may have an initial DOP alpha value of greater than about 35, greater than about 40, greater than about 45, greater than about 50, or even greater than about 60, indicating that the media has a low initial pressure drop and a high initial efficiency. After 60 minutes of DOP loading, a filter media may have a DOP alpha value of greater than about 7, greater than about 9, greater than about 11, greater than about 13, or even greater than about 15, indicating that the media is able to maintain acceptable alpha values well into the filtration process even when it is charged. The initial pressure drop of the filter media may be, for example, less than about 3.0 mm $H_2O$, less than about 2.5 mm $H_2O$, or less than about 2.0 mm $H_2O$. The pressure drop after 60 minutes of DOP loading may be, for example, less than about 10.0 mm $H_2O$, less than about 8.0 mm $H_2O$, less than about 6.0 mm $H_2O$, less than about 4.0 mm $H_2O$, less than about 3.5 mm $H_2O$, less than about 3.0 mm $H_2O$, less than about 2.5 mm $H_2O$, or less than about 2.0 mm $H_2O$.

The filter media may have a low initial DOP penetration and a low DOP penetration after 60 minutes of DOP loading, indicating that the filter media has high efficiency. For example, the initial DOP penetration may be less than about 40%, less than about 30%, less than about 25%, less than about 20%, less than about 15%, or less than about 10%. In some embodiments, such as in certain paint spray and residential (e.g., furnace) filter applications, the initial DOP penetration is less than about 90%, less than about 75%, or less than about 60%. The DOP penetration after 60 minutes of DOP loading may be, for example, less than about 70%, less than about 60%, less than about 55%, less than about 50%, less than about 45%, or less than about 40%. Low values of penetration may be achieved in conjunction with low pressure drop values across the filter, such as the pressure drop values described above. In one set of embodiments, such as in certain paint spray and residential (e.g., furnace) filter applications, the DOP penetration after 60 minutes of DOP loading is less than about 95%, less than about 85%, or less than about 75%.

A filter media including a waved and charged layer may also have a high NaCl alpha value. For instance, a filter media may have an initial NaCl alpha of greater than about 40, greater than about 50, greater than about 55, greater than about 60, greater than about 65, or even greater than about 70. After 60 minutes of NaCl loading, a filter media may have a NaCl alpha value of greater than about 20, greater than about 30, greater than about 35, greater than about 40, or even greater than about 45, indicating that the media is able to maintain acceptable alpha values well into the filtration process even when it is charged. The initial pressure drop of the filter media may be, for example, less than about 5.0 mm $H_2O$, less than about 4.5 mm $H_2O$, less than about 4.0 mm $H_2O$, less than about 3.5 mm $H_2O$, or less than about 3.0 mm $H_2O$. The pressure drop after 60 minutes of NaCl loading may be, for example, less than about 30 mm $H_2O$, less than about 25 mm $H_2O$, less than about 20 mm $H_2O$, less than about 15 mm $H_2O$, less than about 10 mm $H_2O$, less than about 7 mm $H_2O$, or less than about 5 mm $H_2O$, indicating that the pressure drop across the media is gradual over time.

The filter media may have a low initial NaCl penetration and a low NaCl penetration after 60 minutes of NaCl loading, indicating that the filter media has high efficiency for excluding particles. For example, the initial NaCl penetration may be less than about 20%, less than about 15%, less than about 10%, or less than about 5%. In some embodiments, such as in certain paint spray and residential (e.g., furnace) filter applications, the initial NaCl penetration is less than about 80%, less than about 60%, or less than about 40%. The NaCl penetration after 60 minutes of NaCl loading may be, for example, less than about 10%, less than about 7%, less than about 5%, less than about 3%, or less than about 2%. Low values of penetration may be achieved in conjunction with low pressure drop values across the filter, such as the pressure drop values described above. In one set of embodiments, such as in certain paint spray and residential (e.g., furnace) filter applications, the NaCl penetration after 60 minutes of NaCl loading is less than about 65%, less than about 50%, or less than about 30%.

In some embodiments, filter media formed with a membrane layer in a waved configuration may exhibit advantageously high DOP alpha values. The filter media formed with a membrane layer in a waved configuration may exhibit advantageously high DOP alpha values when the membrane layer is not charged and functions as a mechanical filter. For example, in some embodiments, the DOP alpha values may be greater than about 20 (e.g., between about 20 and about 80, between about 20 and about 70, between about 20 and about 60, between about 20 and about 50); in some embodiments, the DOP alpha values may be greater than about 25 (e.g., between about 25 and about 80, between about 25 and about 70, between about 25 and about 60, between about 25 and about 50); in some embodiments, the DOP alpha values may be greater than 30 (e.g., between about 30 and about 80, between about 30 and about 70, between about 30 and about 60, between about 30 and about 50); in some embodiments, the DOP alpha may be greater than about 35 (e.g., between about 35 and about 80, between about 35 and about 70, between about 35 and about 60, between about 35 and about 50); in some embodiments, the DOP alpha may be greater than about 50 (e.g., between about 50 and about 80, between about 60 and about 80, between about 70 and about 80); in some embodiments, the DOP alpha may be greater than about 60 (e.g., between about 60 and about 80, between about 70 and about 80); in some embodiments, the DOP alpha may be greater than about 70 (e.g., between about 70 and about 80); and in some embodiments, the DOP alpha may be greater than about 80.

MERV (Minimum Efficiency Reporting Value) ratings are used by the HVAC (Heating, Ventilating and Air Conditioning) industry to describe a filter's ability to remove particulates from the air. The MERV rating is derived from the efficiency of the filter versus particles in various size ranges, and is calculated according to methods detailed in ASHRAE 52.2. A higher MERV rating means better filtration and greater performance. In an exemplary embodiment, filter media according to the present invention have a MERV rating that is in the range of about 7 to 20, however the rating can vary based on the intended use. For example, a filter media may have a MERV rating of greater than about 13, greater than about 15, greater than about 17, or greater than about 19. In one particular set of embodiments, a charged media described herein has a MERV rating of at least 2 greater or at least 3 greater than a filter media having a similar construction but comprising an uncharged fine fiber filtration layer.

The resulting media can also have a variety of thicknesses, air permeabilities, basis weights, and dust holding capacities depending upon the requirements of a desired application. Thickness, as referred to herein, is determined according to TAPPI T411 using an appropriate caliper gage. Basis weight, as referred to herein, is determined according to ASTM D-846. The dust holding capacity, as referred to herein, is tested based on a modification to ASHRAE 52.1 to test dust loading on flat sheet instead of bag. The pressure drop across a 1 ft$^2$ sample is measured at a face velocity of 25 fpm. ASHRAE dust as specified in ASHRAE 52.1 is added in 1 gram increments until a pressure drop of 1.5 inch $H_2O$ is reached. The number of grams to get to this pressure drop is noted in gram/ft$^2$.

For example, in one embodiment, the resulting media can have a thickness $t_m$, as shown in FIG. 1A, in the range of about 1.5 mm to 100 mm (e.g., about 1.5 mm to 25 mm), an amplitude of the peaks and waves of between about 0.025" to 4" (e.g., between about 0.1" to 1.0", between about 0.1" to 2.0", or between about 3.0" to 4.0" in some applications, between about 0.1" and 0.5", or between about 0.1" and 0.3" in other applications), and an air permeability in the range of about 10 CFM to 1000 CFM (e.g., between about 10 CFM to 300 CFM, or between about 600 CFM to 700 CFM). The resulting media can also have a basis weight in the range of about 70 gsm to 1100 gsm (e.g., about 100 gsm to 500 gsm, about 400 gsm to 700, or about 400 gsm to 1000 gsm), a dust holding capacity of at least about 8 g/ft$^2$ @ 25 FPM face velocity using ASHRAE dust loading to 1.5" $H_2O$ pressure drop, and/or a NaCl loading of less than about 50 mm $H_2O$ after loading approximately 60 mg/100 cm$^2$ of 0.26 μm particles at 25 FPM face velocity.

Filter Elements

As previously indicated, the filter media disclosed herein, which may optionally be charged, can be incorporated into a variety of filter elements for use in various applications, including both liquid and air filtration applications. Exemplary uses include ASHRAE bag filters, pleatable HVAC filters, liquid bag filter media, dust bag house filters, residential furnace filters, paint spray booth filters, face masks (e.g., surgical face masks and industrial face masks), cabin air filters, commercial ASHRAE filters, respirator filters, automotive air intake filters, automotive fuel filters, automotive lube filters, room air cleaner filters and vacuum cleaner exhaust filters. The filter elements can have various configurations, and certain exemplary filter element configurations are discussed in more detail below. Other exemplary filter elements include, by way of non-limiting example, radial filter elements that include cylindrical filter media disposed therein, micron-rater vessel bag filters (also referred to as sock filters) for liquid filtration, face masks, etc.

Panel Filter

Figure 2A:
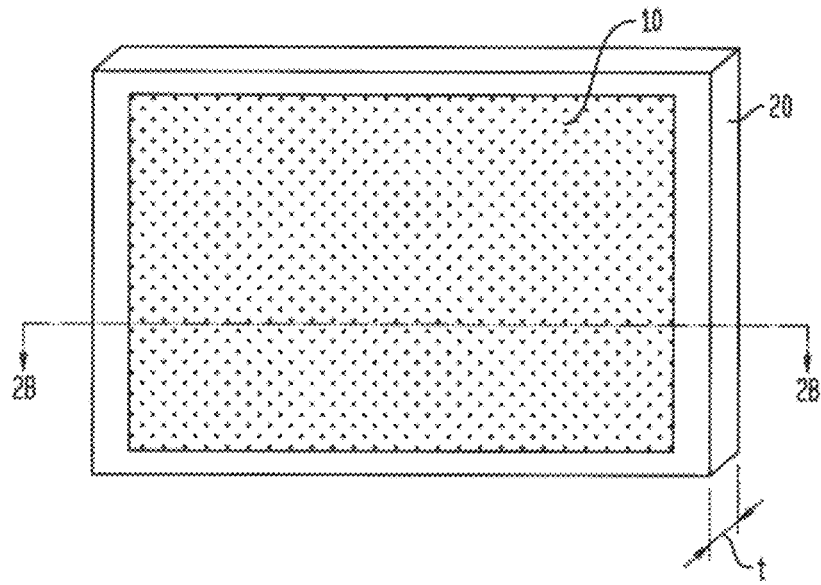
FIG. 2A is a perspective view of one embodiment of a panel filter.
Figure 2B:
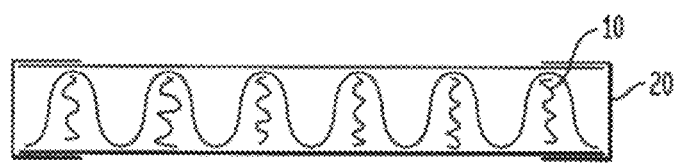
FIG. 2B is a side cross-sectional view of the panel filter of FIG. 2A taken across line 2B.
Figure 3:
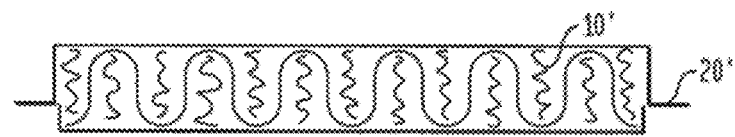
FIG. 3 is a side view of another embodiment of a panel filter.

In one exemplary embodiment, the optionally charged filter media can be used in a panel filter. In particular, the filter media 10 can include a housing disposed therearound. The housing can have various configurations, and the particular configuration can vary based on the intended application. In one embodiment, as shown in FIG. 2A, the housing is in the form of a frame 20 that is disposed around the perimeter of the filter media 10. In the illustrated embodiment, the frame 20 has a generally rectangular configuration such that it surrounds all four sides of a generally rectangular filter media 10, however the particular shape can vary. The frame 20 can be formed from various materials, including cardboard, metal, polymers, etc. In certain exemplary embodiments, the frame 20 can have a thickness t that is about 12" or less, and more preferably about 2" or less. FIG. 2B illustrates a side cross-sectional view of the frame showing the waved filter media 10 disposed therein. In another embodiment, the frame can be formed from the edges of the filter media. In particular, as shown in FIG. 3, a perimeter of the filter media 10' can be thermally sealed to form a frame 20' therearound. The panel filter can also include a variety of other features known in the art, such as stabilizing features for stabilizing the filter media relative to the frame, spacers, etc.

In use, the panel filter element can be used in a variety of applications, including commercial and residential HVAC (e.g., furnace filters); automotive passenger cabin air; automotive air intake; and paint spray booth filters. The particular properties of the filter element can vary based on the intended use, but in certain exemplary embodiments, the filter element has a MERV rating in the range of 7 to 20, and may be, for example, greater than about 13, greater than about 15, greater than about 17, or greater than about 19. The filter element may have a pressure drop in the range of about 0.1" to 5" $H_2O$, e.g., between about 0.1" to 1" $H_2O$.

Pleated Filter

Figure 4A:
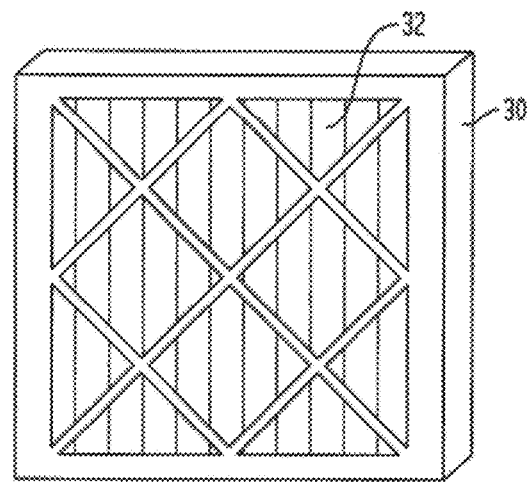
FIG. 4A is a perspective view of one embodiment of a pleated filter element.

The optionally charged waved filter media can also be pleated and used in a pleated filter. As previously discussed, the waved media, or various layers thereof, can be pleated by forming score lines at a predetermined distance apart from one another, and folding the media. A person skilled in the art will appreciate, however, that other pleating techniques can be used. Once the media is pleated, the media can be incorporated into a housing, similar to the panel filter of FIG. 3A. FIG. 4A illustrates one embodiment of a pleated filter media 32 that is disposed within a frame 30. The frame can have various shapes and sizes, as previously discussed with respect to FIG. 3A. The media can have any number of pleats depending on the size of the frame and the intended use. In certain exemplary embodiment, the filter media has 1-2 pleats per inch, and a pleat height in the range of about 0.75" to 2". However, some applications utilize peaks having a height up to 12".

Figure 4B:
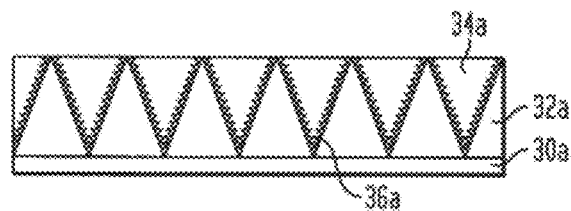
FIG. 4B is a side cross-sectional view of another embodiment of a pleated filter element.
Figure 4C:
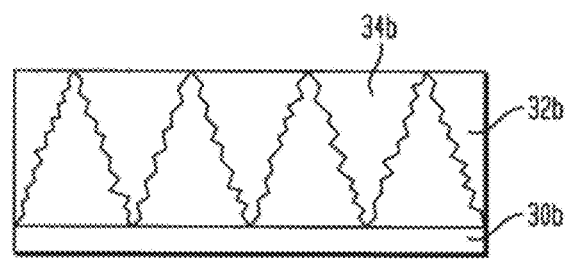
FIG. 4C is a side cross-sectional view of yet another embodiment of a pleated filter element.

In order to facilitate pleating, the filter media can be self-supporting, i.e., it can have a stiffness that allows pleating. In certain exemplary embodiments, the minimum stiffness of the filter media is about 200 mg with Gurley Stiffness tester to enable pleating. Alternatively, or in addition, the filter media can include various stiffening elements. By way of non-limiting example, FIGS. 4B and 4C illustrate a waved filter media 32a, 32b that is pleated, and that includes a stabilizing strap 34a, 34b that is adhered to (e.g., using an adhesive or other bonding techniques) an air outflow side of the filter media 32a, 32b. The filter media 32a, 32b are also shown disposed within a frame 30a, 30b. FIG. 4B further illustrates a screen backing 36a disposed on the filter media 32a to stiffen the media 32a and help retain the pleated configuration. The screen backing 36a can be an expanded metal wire or an extruded plastic mesh.

In use, the optionally charged pleated waved filter element can be used in a variety of applications, including pleatable HVAC filters, residential furnace filters, cabin air filters, commercial ASHRAE filters, automotive air intake filters, automotive fuel filters, automotive lube filters, room air cleaner filters, and vacuum cleaner exhaust filters. The particular properties of the filter element can vary based on the intended use, but in certain exemplary embodiments, the filter element has a MERV rating in the range of 7 to 20. For example, the MERV rating may be greater than about 13, greater than about 15, greater than about 17, or greater than about 19. The filter element may have a pressure drop in the range of about 0.1" to 5" $H_2O$, e.g., between about 0.1" to 1" $H_2O$. The filter media can also have a thickness before pleating of about 0.5" of less, and a thickness after pleating of about 2" or less. However, in certain application the thickness after pleating can be up to 12".

Bag/Pocket Filter

Figure 5A:
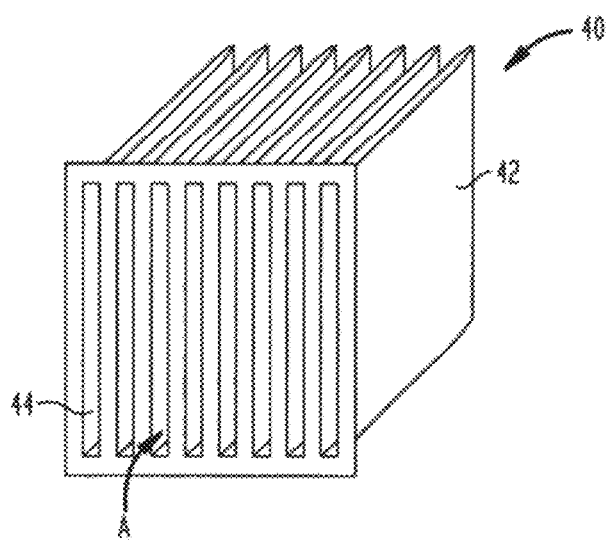
FIG. 5A is a perspective view of one embodiment of a bag filter having multiple filter bags disposed therein.

In yet another embodiment, the optionally charged filter media can be incorporated into a bag or pocket filter for use in heating, air conditioning, ventilation, and/or refrigeration; and micron rated liquid filter bags. The bag or pocket filter can be formed by placing two filter media together (or folding a single filter media in half), and mating three sides (or two if folded) to one another such that only one side remains opens, thereby forming a pocket inside the filter. As shown in FIG. 5A, multiple filter pockets 42 can be attached to a frame 44 to form a filter element 40. Each pocket 42 can be positioned such that the open end is located in the frame, thus allowing air to flow into each pocket 42 in the direction indicated by line A. The frame can include rectangular rings that extend into and retain each pocket. A person skilled in the art will appreciate that the frame can have virtually any configuration, and various mating techniques known in the art can be used to couple the pockets to the frame. Moreover, the frame can include any number of pockets, but bag filters typically include between 6 and 10 pockets.

Figure 5B:
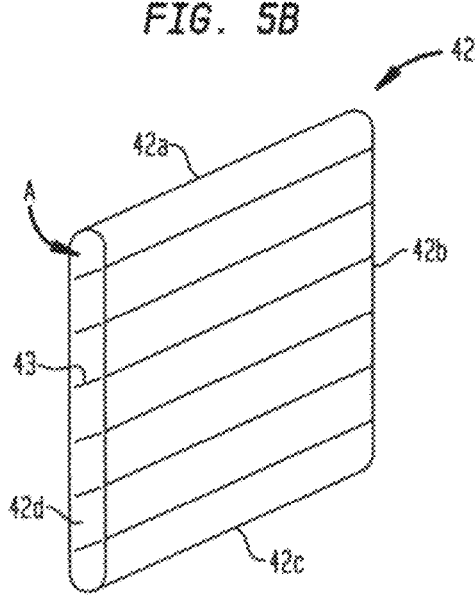
FIG. 5B is a perspective view of one of the filter bags of FIG. 5A.
Figure 5C:
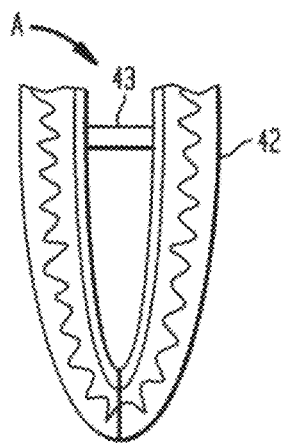
FIG. 5C is a side cross-sectional view of the filter bag of FIG. 5B.

FIG. 5B illustrates one pocket 42 showing three edges 42a, 42b, 42c being closed and one edge 42d being open for receiving airflow therethrough, as indicated by line A. As further shown in FIG. 5B, the pocket filter 42 can also include any number of spacers 43 disposed therein and configured to retain opposed sidewalls of the filter 42 at a predetermined distance apart from one another. The spacers can be threads or any other element extending between both sidewalls. FIG. 5C illustrates a cross-sectional view of the pocket filter 42 of FIG. 5B, showing the spacer 43 extending between the sidewalls. The direction of airflow is again indicated by line A. A person skilled in the art will appreciate that various features known in the art for use with bag or pocket filters can be incorporated into the filter media disclosed herein.

The particular properties of the filter element can vary based on the intended use, but in certain exemplary embodiments, the filter element has a MERV rating in the range of about 7 to 20, and more preferably 13 to 20. For example, the MERV rating may be greater than about 13, greater than about 15, greater than about 17, or greater than about 19. The filter element may have a pressure drop in the range of about 0.1" to 5" $H_2O$, e.g., between about 0.1" to 1" $H_2O$. The filter media can also have a thickness that is about 2" or less, and more preferably about 0.5" or less, however the thickness can vary depending on the intended application.

By way of non-limiting example, a standard 8 pocket ASHRAE bag filter typically has a 30" deep pocket in a 24"×24" frame, and yields 80 sq. ft. of media. An ASHRAE bag filter having the same dimensions, but utilizing a waved filter media according to the present invention, will yield 176 sq. ft. of media.

Facemask

In yet another embodiment, the optionally charged filter media can be incorporated into a personal protective filtration device, such as a facemask, that is designed to remove contaminants from breathable air. In one embodiment, the filter media is used to form an industrial facemask designed for use in the workplace. The facemask may include, for example, an outer structural support layer, a filtration layer, and an inner structural support layer, although any suitable combination of layers can be used. Each of the layers may be charged or uncharged. The structural support layers may be nonwoven layers that are thermally moldable under suitable conditions, e.g., at a temperature of about 105-110° C. for 6-8 seconds. The filtration layers may be formed from meltblown or fiberglass materials. In one set of embodiments, a facemask has a filter area of approximately 170 $cm^2$, which is standard in the United States, or an area of approximately 150 $cm^2$, which may be standard in other areas of the world.

In another embodiment, an optionally charged filter media is used in a surgical facemask. A surgical facemask includes a personal protective filtration device typically worn by medical personnel for two primary reasons: to prevent the transfer of germs from medical personnel to patient (and vice versa), and to protect medical personnel from the strike of insulting bodily fluids. A surgical facemask may include, for example, an outer structural support layer, a filtration layer, and an inner structural support layer, although any suitable combination of layers can be used. Each of the layers may be charged or uncharged. In some embodiments, the structural support layers are polypropylene spunbond and the filtration layers are formed from meltblown or fiberglass materials. The filter media may be folded for larger coverage area, and may include a filter area of, for example, 200-1000 $cm^2$.

The following non-limiting examples serve to further illustrate the present invention:

Example 1

Comparative Sample A (Control)

Sample A is a planar filter media that is manufactured by Johns Manville and sold as CM285B-2, and it is an 80-85% glass mat filter media. The properties of the media were tested and are listed below in Table 1 under Sample A.

For all samples prepared in Example 1, the DOP Penetration and DOP alpha were measured after discharging the media using isopropyl alcohol. In particular, the sample was placed in a container containing a 100% isopropyl alcohol solution, and allowed to soak for approximately 5 seconds or until full saturation was achieved. The sample was then removed from the solution and allowed to drain for approximately 30 seconds. The sample was then placed in a fume/vacuum hood and allowed to air dry. Drying time was greatly dependent upon the thickness of the sample, and varied from 20 minutes to 48 hours. The DOP Penetration and DOP alpha tests were then performed.

Comparative Sample B (Control)

Sample B is a planar filter media that is manufactured by Hollingsworth & Vose Company and sold as AS8020DD, and it is 80-85% synthetic filter media. The properties of the media were tested and are listed below in Table 1 under Sample B.

Sample C

Sample C was formed using four layers, listed in order from upstream (air entry) to downstream (air outflow): (1) a top airlaid layer, (2) an upstream airlaid coarse support layer, (3) a fine fiber meltblown layer, and (4) a downstream airlaid coarse support layer.

The top airlaid layer was formed from 50% of a 2 denier by 6 mm Type 255 bicomponent fiber available from Invista, and 50% of a 0.9 denier by 6 mm Type 510 polyethyleneterephthalate (PET) fiber available from Wellman. The top airlaid layer was bonded in an oven. The top airlaid layer had a basis weight of 25 gsm, a thickness of 30 mil, and an air permeability of 850 CFM.

The upstream airlaid coarse support layer was formed from 70% of a 2 denier by 6 mm Type 255 bicomponent fiber available from Invista, 20% of a 0.9 denier by 6 mm Type 510 PET fiber available from Wellman, and 10% of a 15 denier by 6 mm Type 341 PET fiber available from Wellman. The upstream airlaid coarse support layer had a basis weight of 40 gsm, a thickness of 40 mil, and an air permeability of 800 CFM.

The fine fiber meltblown layer was formed from a polypropylene fiber having an average fiber diameter of 1.4 µm. The basis weight of the meltblown layer was 20 gsm, the thickness was 7 mil, and the air permeability was 56 CFM.

The downstream airlaid coarse support layer was formed from 50% of a 2 denier by 6 mm Type 255 fiber available from Invista, and 50% of a 15 denier by 6 mm Type 341 PET fiber available from Wellman. The downstream airlaid coarse support layer had a basis weight of 40 gsm, a thickness of 40 mil, and an air permeability of 2000 CFM.

The upstream coarse support layer, the fine fiber meltblown layer, and the downstream coarse support layer were formed into a waved configuration by placing the layers on a first moving surface traveling at a speed of about 25 m/min. The layers traveled from the first moving surface to a second moving surface traveling at a speed of about 10 m/min, and as a result 4 waves per inch were formed. The waved webs and the top layer were then thermally bonded in an oven at 130° C. The properties of the resulting media were tested and are listed below in Table 1 under Sample C.

Sample D

Sample C was repeated to form Sample D, however the fine fiber meltblown layer was formed from a polypropylene fiber having an average fiber diameter of 0.6 µm on a 10 gsm polypropylene spunbond. The basis weight of the meltblown layer was 7 gsm. The properties of the resulting media were tested and are listed below in Table 1 under Sample D.

Sample E

Sample C was repeated to form Sample E. The properties of the resulting media were tested and are listed below in Table 1 under Sample E.

TABLE 1

| | Sample A | Sample B | Sample C | Sample D | Sample E |
|---|---|---|---|---|---|
| Total Basis Weight (gsm) | 71 | 125 | 245 | 245 | 256 |
| Thickness (mil) | 60 | 65 | 283 | 308 | 275 |
| Air Permeability (CFM) | 61 | 130 | 71 | 97 | 67 |
| Resistance (mmH$_2$O) @ 10.5 FPM | 2.3 | 1.1 | 2.7 | 1.7 | 2.5 |
| Resistance (mmH$_2$O) @ 25 FPM | 6 | 5 | 6.7 | 4.4 | 5.6 |
| DOP Penetration (%) at 10.5 FPM after IPA soak | 48 | 88 | 45 | 52 | 46 |
| DOP alpha at 10.5 FPM after IPA soak | 13.9 | 5.0 | 12.8 | 16.7 | 13.5 |
| Dust Holding Capacity (g/ft$^2$ @ 25 FPM to 1.5" H$_2$O) | 7.7 | 5.9 | 12.3 | 11.5 | 10.3 |

As shown in Table 1, Samples C, D, and E have improved dust holding capacities and higher or equivalent DOP alpha after discharge using isopropyl alcohol as compared to Samples A and B. The various properties of Samples A-E are compared in graphs set forth in FIGS. 6-9.

FIG. 6 illustrates the discharged DOP Penetration versus the pressure drop. As shown, Sample B has a high initial pressure drop which decreases significantly as the penetration increases. Samples A, C, D, and E, on the other hand, have a low initial pressure drop that decreases slowly as the penetration increases. Thus, Samples C, D, and E have properties that are comparable to Sample A, which is a glass fiber mat, and that are superior to Sample B, which is a meltblown web. FIG. 6 therefore illustrates that the waved configuration of Samples C, D, and E advantageously improve the pressure drop as a function of penetration, and thus provide a suitable alternative to glass mat fiber webs.

FIG. 7 illustrates the dust holding capacity of Samples A-E. As shown, Samples A and B show a significantly lower dust holding capacity as compared to Samples C, D, and E. Thus, the waved configuration of Samples C, D, and E results in an improved dust holding capacity as compared to the planar configuration of Samples A and B.

Example 2

A first planar fine fiber meltblown layer, referred to as Meltblown C, was prepared having the same configuration as the fine fiber meltblown layer of Sample C. The basis weight of Meltblown C was 20 gsm.

A second planar fine fiber meltblown layer, referred to as Meltblown D, was prepared having the same configuration as the fine fiber meltblown layer of Sample D. The basis weight of Meltblown D was 20 gsm.

The NaCl loading for Meltblown C and Meltblown D, as well as for Samples C and D from Example 1 above, were tested and the NaCl Loading at 76 lpm is shown in FIG. 8. As shown, the waved filter media of Samples C and D show a significant improvement in NaCl loading, as the resistance remains low over a longer period of time, as compared to Meltblown C and Meltblown D.

Example 3

Comparative Sample F

Sample F was formed using four layers, listed in order from upstream (air entry) to downstream (air outflow): (1) a top carded nonwoven layer, (2) a fine fiber meltblown layer, and (3) a downstream carded nonwoven layer.

The top and bottom nonwoven layers were formed from 45% of a 3 denier by 1.75" Type 202 bicomponent fiber available from FIT, and 30% of a 3 denier by 2" Type N39 PET fiber available from Poole. The top and bottom nonwoven layers were each bonded in an oven. The top and bottom nonwoven layers each had a basis weight of 160 gsm, a thickness of 155 mil, and an air permeability of 420 CFM.

The fine fiber meltblown layer was formed from a polypropylene fiber having an average fiber diameter of 1.1 µm. The basis weight of the meltblown layer was 35 gsm, the thickness was 11 mil, and the air permeability was 39 CFM.

The top and bottom nonwoven layers were positioned on opposite sides of the fine fiber meltblown layer to form a planar filter media. The properties of the resulting media were tested and are listed below in Table 1 under Sample F.

Sample G

Sample G was formed using four layers, listed in order from upstream (air entry) to downstream (air outflow): (1) a top airlaid layer, (2) an upstream airlaid coarse support layer, (3) a fine fiber meltblown layer, and (4) a downstream airlaid coarse support layer.

The top airlaid layer was formed from 50% of a 2 denier by 6 mm Type 255 bicomponent fiber available from Invista, and 50% of a 0.9 denier by 6 mm Type 510 polyethylene terephthalate (PET) fiber available from Wellman. The top airlaid layer was bonded in an oven. The top airlaid layer had a basis weight of 25 gsm, a thickness of 40 mil, and an air permeability of 850 CFM.

The upstream airlaid coarse support layer was formed from 70% of a 2 denier by 6 mm Type 255 bicomponent fiber available from Invista, 20% of a 0.9 denier by 6 mm Type 510 PET fiber available from Wellman, and 10% of a 15 denier by 6 mm Type 341PET fiber available from Wellman. The upstream airlaid coarse support layer had a basis weight of 40 gsm, a thickness of 40 mil, and an air permeability of 800 CFM.

The fine fiber meltblown layer was formed to correspond to the fine fiber meltblown layer of Sample F. In particular, the fine fiber meltblown layer was formed from a polypropylene fiber having an average fiber diameter of 1.1 µm. The basis weight of the meltblown layer was 35 gsm, the thickness was 11 mil, and the air permeability was 39 CFM.

The downstream airlaid coarse support layer was formed from 50% of a 2 denier by 6 mm Type 255 fiber available from Invista, and 50% of a 15 denier by 6 mm Type 341 PET fiber available from Wellman. The downstream airlaid coarse support layer had a basis weight of 38 gsm, a thickness of 40 mil, and an air permeability of 2000 CFM.

The upstream coarse support layer, the fine fiber meltblown layer, and the downstream coarse support layer were formed into a waved configuration by placing the layers on a first moving surface traveling at a speed of about 25 m/min. The layers traveled from the first moving surface to a second moving surface traveling at a speed of about 10 m/min, and as a result 4 waves per inch were formed. The waved webs and the top layer were then thermally bonded in an oven at 140° C. The properties of the resulting media were tested and are listed below in Table 2 under Sample G.

TABLE 2

|  | Sample F | Sample G |
| --- | --- | --- |
| Total Basis Weight (gsm) | 350 | 259 |
| Total Thickness (mil) | 330 | 269 |
| Air Permeability (CFM) | 34.2 | 38.8 |
| Caliper (mm) | 6.79 | 4.6 |
| Capacity (g/m$^2$) | 128.03 | 324.22 |
| Test Time (minutes) | 33.81 | 85.27 |
| Beta75 | 15.8 | 7.6 |

As shown in Table 2, waved Sample G has a lower Beta$_{75}$ than planar Sample F. Beta$_{75}$ is determined by ISO 16889. Using a FTI Multipass Filter Test Stand available from Fluid Technologies Inc., of Stillwater, Okla., an A2 fine dust is fed at a rate of 0.3 liters per minute into Mobil MIL-H-5606 fuel for a total flow rate of 1.7 liters per minute until a terminal pressure of 172 KPa above the baseline filter pressure drop is obtained. Particle counts (particles per milliliter) at the particle sized selected (in this case 4, 5, 7, 10, 15, 20, 25, and 30 microns) upstream and downstream of the media are taken at ten points equally divided over the time of the test. The average of upstream and downstream particle counts are taken at each selected particle size. From the average particle count upstream (injected-$C_0$) and the average particle count downstream (passed thru-C) the liquid filtration efficiency test value for each particle size selected is determined by the relationship $[(100-[C/C_0])*100\%]$. Another expression of efficiency is Beta Rating. Beta$_{75}$ is defined as the particle size where the ratio of the upstream count ($C_0$) to downstream count (C) equals 75 (efficiency equals 98.67%). The lower the Beta Rating, the lower the particle size for an efficiency. Generally, efficiency decreases as the particle size decreases.

FIG. 9 illustrates the pressure of Samples F and G as a function of time, as tested using a multi-pass test for liquid filtration per ISO 16889. During such a test, a dust is dispersed in oil, and the dispersion is passed through the filter media until a given pressure drop is reached (172 kPa in this test). It is more desirable to have the pressure increase over a longer period of time. As shown in FIG. 9, Sample G loads in 85 minutes while the comparable flat sheet of Sample F loads in 34 minutes.

Example 4

Sample H

Sample H was formed using four layers, listed in order from upstream (air entry) to downstream (air outflow): (1) an upstream carded fiber coarse support layer, (2) a fine fiber meltblown layer, (3) a downstream carded fiber coarse support layer, and (4) a bottom spunbond layer.

The upstream carded fiber coarse support layer was formed from 70% of a 2 denier by 1.5 inch Type 256 bicomponent fiber available from Trevira and 30% of a 3 denier by 2 inch Type P320 PET fiber available from Barnet. The upstream carded fiber coarse support layer had a basis weight of 35 gsm, a thickness of 40 mil, and an air permeability of 800 CFM.

The fine fiber meltblown layer was formed from a polypropylene fiber having an average fiber diameter of about 0.7 µm. The basis weight of the meltblown layer was 15 gsm, the thickness was 5 mil, and the air permeability was 68 CFM.

The downstream carded fiber coarse support layer was formed from 40% of a 2 denier by 1.5 inch Type 256 fiber available from Trevira, and 60% of a 3 denier by 2 inch Type P320 PET fiber available from Barnet. The downstream airlaid coarse support layer had a basis weight of 35 gsm, a thickness of 40 mil, and an air permeability of 1000 CFM.

The bottom spunbond layer was a polypropylene spunbond purchased from Polymer Group, Inc. The bottom spunbond layer had a basis weight of 15 gsm, a thickness of 3 mil, and an air permeability of 1200 CFM.

The upstream coarse support layer, the fine fiber meltblown layer, and the downstream coarse support layer were formed into a waved configuration by placing the layers on a first moving surface traveling at a speed of about 10 m/min. The layers traveled from the first moving surface to a second moving surface traveling at a speed of about 4 m/min, and as a result 3 waves per inch were formed. The waved webs and the bottom spunbond layer were then thermally bonded in an oven at 130° C. The properties of the resulting media were tested and are listed below in Table 3 under Sample H.

Sample I

Sample G was repeated for Sample I, however a bonded, carded fiber layer was used in place of the bottom spunbond layer. The bottom carded fiber layer was formed from 50% of a 2 denier by 1.5 inch Type 256 bicomponent fiber available from Trevira, and 50% of a 0.9 denier by 1.5 inch Type P1842B polyethyleneterephthalate (PET) fiber available from Barnet. The bottom carded fiber layer was pre-bonded in an oven at 130° C. The top airlaid layer had a basis weight of 25 gsm, a thickness of 20 mil, and an air permeability of 890 CFM. The properties of the resulting media were tested and are listed below in Table 3 under Sample I.

TABLE 3

| Physical Property | Sample G | Sample I |
| --- | --- | --- |
| Coverstock (SB/NW) | Spunbond | Nonwoven |
| Basis Weight (g/m$^2$) | 206.1 | 228.78 |
| Caliper (mils) | 234 | 457.63 |
| Air Permeability (CFM) | 81 | 80 |
| Initial Values: | | |
| Airflow Resistance @ 32 lpm; 100 cm$^2$ (mm H$_2$O) | 2.14 | 2.10 |
| Airflow Resistance @ 76 lpm; 100 cm$^2$ (mm H$_2$O) | 5.54 | 5.29 |
| NaCl Penetration @ 32 lpm; 100 cm$^2$ (%) | 39.7 | 34.7 |
| NaCl Penetration @ 76 lpm; 100 cm$^2$ (%) | 45.6 | 42.7 |
| NaCl Alpha @ 32 lpm; 100 cm$^2$ (mm H$_2$O$^{-1}$) | 18.8 | 21.9 |
| NaCl Alpha @ 76 lpm; 100 cm$^2$ (mm H$_2$O$^{-1}$) | 6.2 | 7.0 |
| DOP Penetration @ 32 lpm; 100 cm$^2$ (%) | 47.8 | 44.1 |
| DOP Penetration @ 76 lpm; 100 cm$^2$ (%) | 52.4 | 48.7 |
| DOP Alpha @ 32 lpm; 100 cm$^2$ (mm H$_2$O$^{-1}$) | 15.0 | 16.9 |
| DOP Alpha @ 76 lpm; 100 cm$^2$ (mm H$_2$O$^{-1}$) | 5.1 | 5.9 |
| After IPA Discharge: | | |
| Airflow Resistance @ 32 lpm; 100 cm$^2$ (mm H$_2$O) | 2.12 | 2.03 |
| Airflow Resistance @ 76 lpm; 100 cm$^2$ (mm H$_2$O) | 5.32 | 5.41 |
| NaCl Penetration @ 32 lpm; 100 cm$^2$ (%) | 39.4 | 34.4 |
| NaCl Penetration @ 76 lpm; 100 cm$^2$ (%) | 45.7 | 39.1 |
| NaCl Alpha @ 32 lpm; 100 cm$^2$ (mm H$_2$O$^{-1}$) | 19.1 | 22.8 |
| NaCl Alpha @ 76 lpm; 100 cm$^2$ (mm H$_2$O$^{-1}$) | 6.4 | 7.5 |
| DOP Penetration @ 32 lpm; 100 cm$^2$ (%) | 47.5 | 42.6 |
| DOP Penetration @ 76 lpm; 100 cm$^2$ (%) | 52.7 | 47.7 |
| DOP Alpha @ 32 lpm; 100 cm$^2$ (mm H$_2$O$^{-1}$) | 15.2 | 18.3 |
| DOP Alpha @ 76 lpm; 100 cm$^2$ (mm H$_2$O$^{-1}$) | 5.2 | 6.0 |
| Dust Holding Value (25 fpm to 1.5" H2O) (grams/ft$^2$) | 10.3 | 11.0 |

Example 5

Sample J

Sample G was repeated for Sample J, however the fine fiber meltblown layer was a 6 gsm, 0.7 µm polypropylene meltblown. The fine fiber meltblown layer had a thickness of 2.4 mil and an air permeability of 167 CFM. The properties of the resulting media were tested and are listed below in Table 4 under Sample J.

Sample K

Sample G was repeated for Sample K however the fine fiber meltblown layer was a 22 gsm, 0.7 µm polypropylene meltblown. The fine fiber meltblown layer had a thickness of 6.8 mil and an air permeability of 37 CFM. The properties of the resulting media were tested and are listed below in Table 4 under Sample K.

TABLE 4

| Physical Property | Sample G | Sample I |
|---|---|---|
| Coverstock (SB/NW) | Spunbond | Spunbond |
| Basis Weight (g/m²) | 192.4 | 206.1 |
| Caliper (mils) | 215 | 224 |
| Air Permeability (CFM) | 110 | 48 |
| *Initial Values:* | | |
| Airflow Resistance @ 32 lpm; 100 cm² (mm H₂O) | 1.36 | 3.23 |
| Airflow Resistance @ 76 lpm; 100 cm² (mm H₂O) | 3.64 | 8.12 |
| NaCl Penetration @ 32 lpm; 100 cm² (%) | 58.8 | 27.6 |
| NaCl Penetration @ 76 lpm; 100 cm² (%) | 63.8 | 34.8 |
| NaCl Alpha @ 32 lpm; 100 cm² (mm H₂O⁻¹) | 17.0 | 17.3 |
| NaCl Alpha @ 76 lpm; 100 cm² (mm H₂O⁻¹) | 5.4 | 5.6 |
| DOP Penetration @ 32 lpm; 100 cm² (%) | 65.9 | 33.8 |
| DOP Penetration @ 76 lpm; 100 cm² (%) | 71.2 | 40.5 |
| DOP Alpha @ 32 lpm; 100 cm² (mm H₂O⁻¹) | 13.3 | 14.6 |
| DOP Alpha @ 76 lpm; 100 cm² (mm H₂O⁻¹) | 4.1 | 4.8 |
| *After IPA Discharge:* | | |
| Airflow Resistance @ 32 lpm; 100 cm² (mm H₂O) | 1.32 | 3.25 |
| Airflow Resistance @ 76 lpm; 100 cm² (mm H₂O) | 3.62 | 8.02 |
| NaCl Penetration @ 32 lpm; 100 cm² (%) | 57.3 | 26.9 |
| NaCl Penetration @ 76 lpm; 100 cm² (%) | 62.1 | 34.8 |
| NaCl Alpha @ 32 lpm; 100 cm² (mm H₂O⁻¹) | 18.3 | 17.5 |
| NaCl Alpha @ 76 lpm; 100 cm² (mm H₂O⁻¹) | 5.7 | 5.7 |
| DOP Penetration @ 32 lpm; 100 cm² (%) | 65.5 | 35.8 |
| DOP Penetration @ 76 lpm; 100 cm² (%) | 69.8 | 39.5 |
| DOP Alpha @ 32 lpm; 100 cm² (mm H₂O⁻¹) | 13.92 | 13.73 |
| DOP Alpha @ 76 lpm; 100 cm² (mm H₂O⁻¹) | 4.31 | 5.03 |
| Dust Holding Value (25 fpm to 1.5" H2O) (grams/ft²) | 11.5 | 8.9 |

Example 6

Comparative Sample L

Sample L was formed using three layers, listed in order from upstream (air entry) to downstream (air outflow): (1) a top carded nonwoven layer, (2) a fine fiber meltblown layer, and (3) a downstream carded nonwoven layer. The sample was charged and had an unwaved configuration.

The top and bottom layers were formed from three different polyester fibers: 60% of a 4 denier by 2" Type P1140 fiber available from Barnett, 30% of a 6 denier by 1.5" Type T295 fiber available from Kosa, and 10% of a 1.2 denier by 1.5" Type TP1250 fiber available from Barnett. The three fibers had diameters of 20.3 µm, 24.8 µm and 11.1 µm, respectively. The top and bottom nonwoven layers were each bonded in an oven. The top and bottom nonwoven layers each had a basis weight of 90 gsm, a thickness of 89 mil, and an air permeability of 690 CFM.

The fine fiber meltblown layer was formed from a polypropylene fiber having an average fiber diameter of 1.97 µm. The basis weight of the meltblown layer was 22 gsm, the thickness was 7.5 mil, and the air permeability was 75 CFM.

The top and bottom nonwoven layers were positioned on opposite sides of the fine fiber meltblown layer to form the filter media. The sample was charged by subjecting it to four DC charge pinner bars. Each bar emitted a negative charge and operated under 30 kilovolts and 5 mA. Charging occurred at a temperature of 90 degrees F. and at a 15% humidity level.

Comparative Sample M

Sample M was formed using a single layer of fine meltblown fiber, constructed in an unwaved configuration. The fine fiber meltblown layer was formed from a polypropylene fiber having an average fiber diameter of 1.0 µm. The basis weight of the meltblown layer was 11.5 gsm, the thickness was 3.9 mil, and the air permeability was 77 CFM. The sample was charged by subjecting it to four DC charge pinner bars. Each bar emitted a negative charge and operated under 30 kilovolts and 5 mA. Charging occurred at a temperature of 90 degrees F. and at a 15% humidity level.

Sample N

Sample N was formed using four layers, listed in order from upstream (air entry) to downstream (air outflow): (1) an upstream carded fiber coarse support layer, (2) a fine fiber meltblown layer, (3) a downstream carded fiber coarse support layer, and (4) a spunbond layer. The sample was charged. Layers (1)-(3) had a waved configuration and layer (4) had a planar configuration.

The upstream and downstream carded fiber coarse support layers each were formed from 65% of a 2 denier by 1.5 inch Type PC68055 polyester fiber having an average diameter of 14.3 microns available from Consolidated, and 35% of a 3 denier by 2 inch Type P320 polyester fiber having an average diameter of 17.6 microns available from Nan Ya. The upstream and downstream carded fiber coarse support layers each had a basis weight of 80 gsm, a thickness of 40 mil, and an air permeability of 219 CFM.

The fine fiber meltblown layer was formed from a polypropylene fiber having an average fiber diameter of 1.0 µm. The basis weight of the meltblown layer was 11.5 gsm, the thickness was 3.9 mil, and the air permeability was 77 CFM.

The upstream coarse support layer, the fine fiber meltblown layer, and the downstream coarse support layer were formed into a waved configuration by placing the layers on a first moving surface traveling at a speed of about 10 m/min. The layers traveled from the first moving surface to a second moving surface traveling at a speed of about 4 m/min, and as a result 3 waves per inch were formed. The waved webs and the bottom spunbond layer were then thermally bonded in an oven at 141° C.

A spunbond layer was formed from a polypropylene fiber having an average fiber diameter of about 35 µm. The basis weight of the spunbond layer was 15.3 gsm, the thickness was 13 mil, and the air permeability was 650 CFM.

After the layers were assembled, the sample was charged by subjected it to four DC charge pinner bars. Each bar emitted a negative charge and operated under 30 kilovolts and 5 mA. Charging occurred at a temperature of 90 degrees F. and at a 15% humidity level.

Sample O

Figure 10:
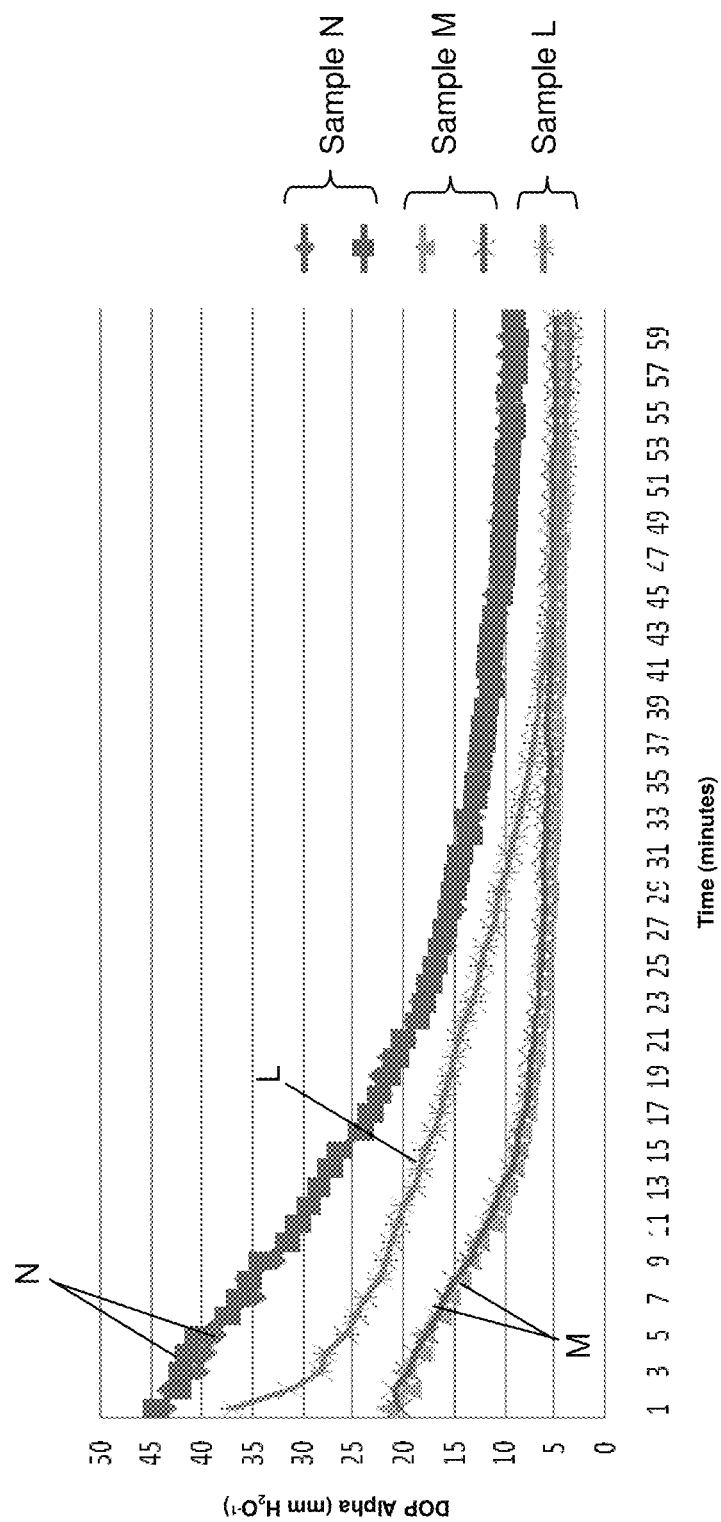
FIG. 10 is a chart showing DOP alpha versus time for various filter media.

DOP alpha tests were performed with Samples L, M and N, as illustrated in FIG. 10, which shows DOP alpha as a function of time. As shown, Sample N has an approximately 20% higher initial DOP alpha than Sample L, and greater than 100% higher initial DOP alpha than sample M. Additionally, Sample N retains a higher DOP alpha throughout the experiment, and has double the DOP alpha value after 60 minutes compared to Samples L and M. FIG. 10 illustrates, therefore, that the charged waved configuration of Sample N advantageously improves the initial DOP alpha value, as well as the DOP alpha value as a function of time, compared to the charged, unwaved configurations of Samples L and N.

Figure 11:
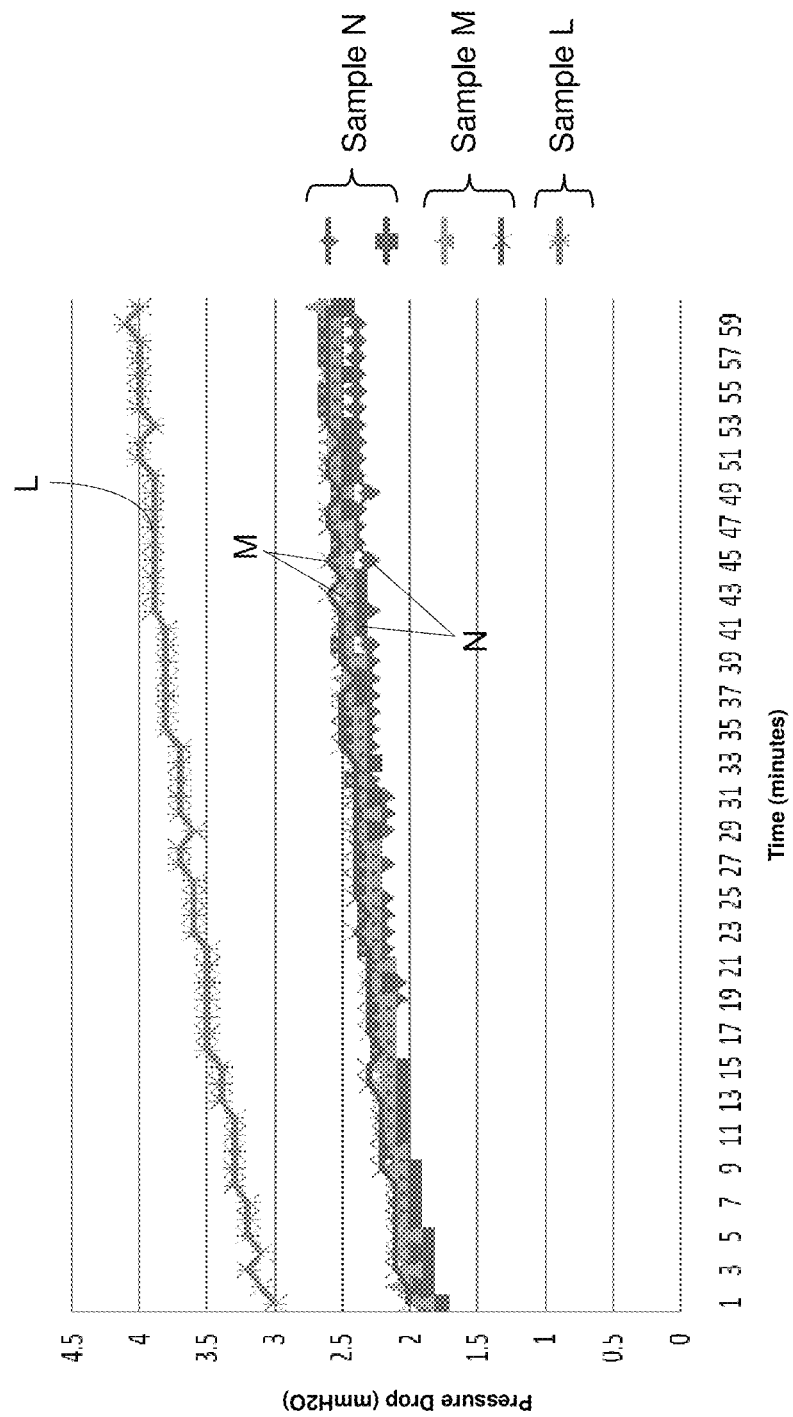
FIG. 11 is a chart showing pressure drop during DOP loading versus time for various filter media.

The pressure drop across each of Samples L, M and N were measured as a function of time, as shown in FIG. 11. As illustrated in FIG. 11, the pressure drop profile for Sample L was higher than Sample M, as expected, because the additional support layers of Sample L contributed to the relative increase in pressure drop compared to the single layer of Sample M. However, the pressure drop profile for the charged waved media of Sample N was similar to that of the single layer of charged unwaved media of Sample M, indicating that the better performance characteristics of Sample N (e.g., a lower pressure drop profile) was due to the waved configuration of the sample.

Figure 12:
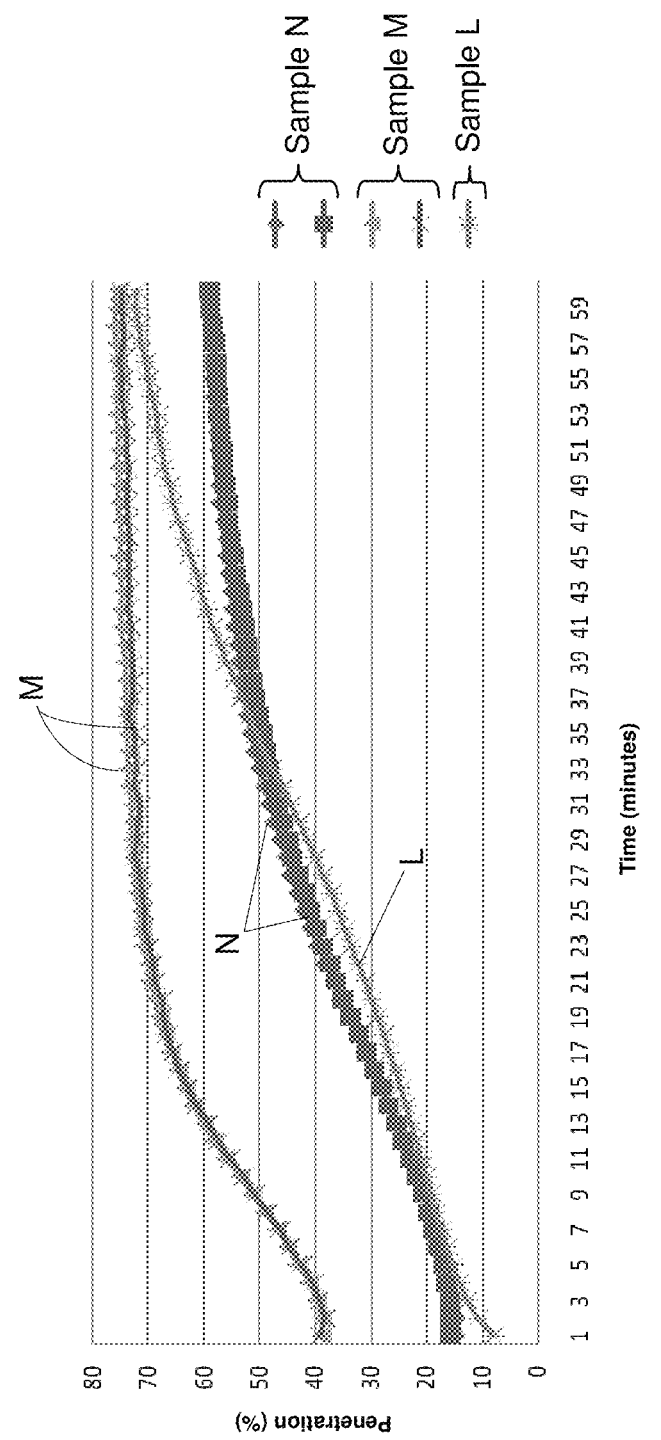
FIG. 12 is a chart showing DOP penetration versus time for various filter media.

DOP Penetration tests were performed with Samples L, M and N, as illustrated in FIG. 12, which shows penetration as a function of time. Sample N generally has lower penetration values and, therefore, higher efficiency, as a function of time than Samples L or M. The lower penetration values contribute to the higher DOP alpha values observed in the charged waved media shown in FIG. 10. Sample N also increases in penetration more slowly and ends with a lower penetration at 60 minutes than Samples L or M. This shows that the efficiency in the charged waved configuration of Sample N decays more slowly compared to the charged, unwaved configurations. FIG. 12 also illustrates that the charged waved configuration of Sample N has less of a change in efficiency as a function of time at a constant pressure drop. For instance, for Sample N, the penetration at time=0 is about 16% and the penetration at time=60 seconds is about 59%, resulting in a change in penetration of 43%. For sample L, the penetration at time=0 is about 8% and the penetration at time=60 seconds is about 72%, resulting in a change in penetration of about 64%.

Figure 13:
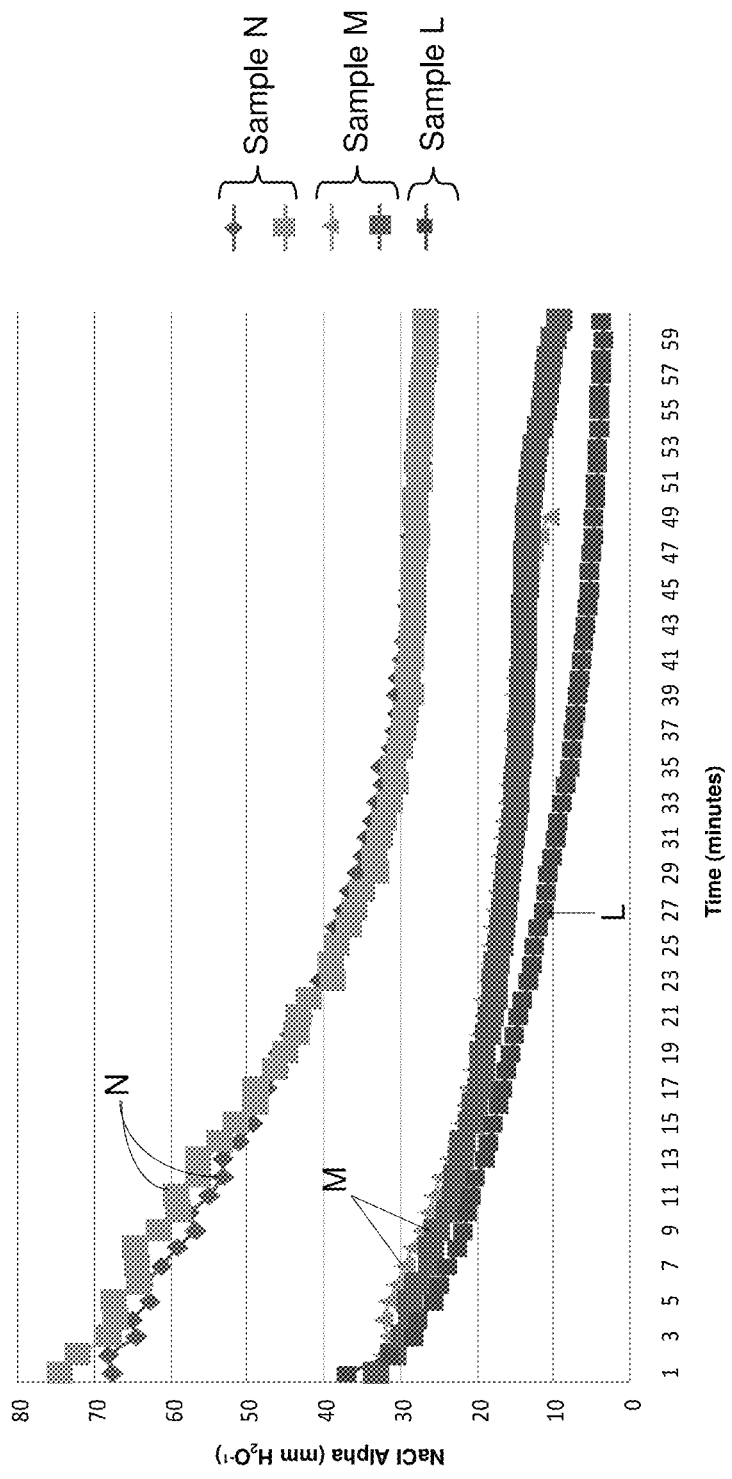
FIG. 13 is a chart showing NaCl loading versus time for various filter media.

To test the response of Samples L, M and N to solid particulate loading, NaCl loading tests were performed. As shown in FIG. 13, the charged waved filter media of Sample N showed a significant improvement in NaCl loading compared to Samples L and M, as the initial NaCl alpha values are higher and the NaCl alpha remains higher over a longer period of time.

Figure 14:
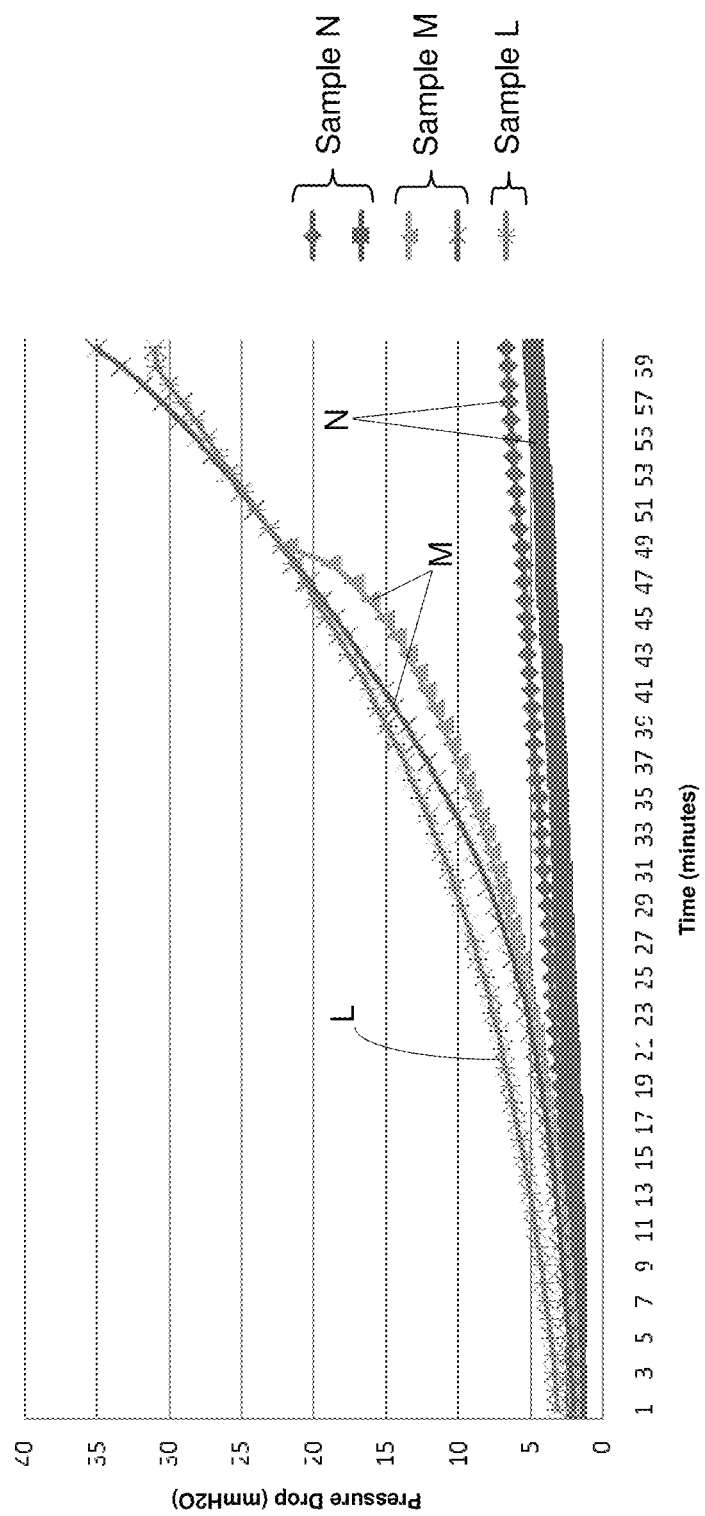
FIG. 14 is a chart showing pressure drop during NaCl loading versus time for various filter media.

The pressure drop across each of Samples L, M and N were measured as a function of time, as shown in FIG. 14. As illustrated in FIG. 11, the pressure drop increase for the charged waved media of Sample N is much lower than that for the charged, unwaved media of Samples L and M. Without wishing to be bound by theory, it is hypothesized that the increased surface area of the waved layers allows more particles to be loaded up without blocking the pores of the media, contributing to the low overall pressure drop across the media. This shows that charged waved media may be advantageous for applications where loading of fine particles is important.

Figure 15:
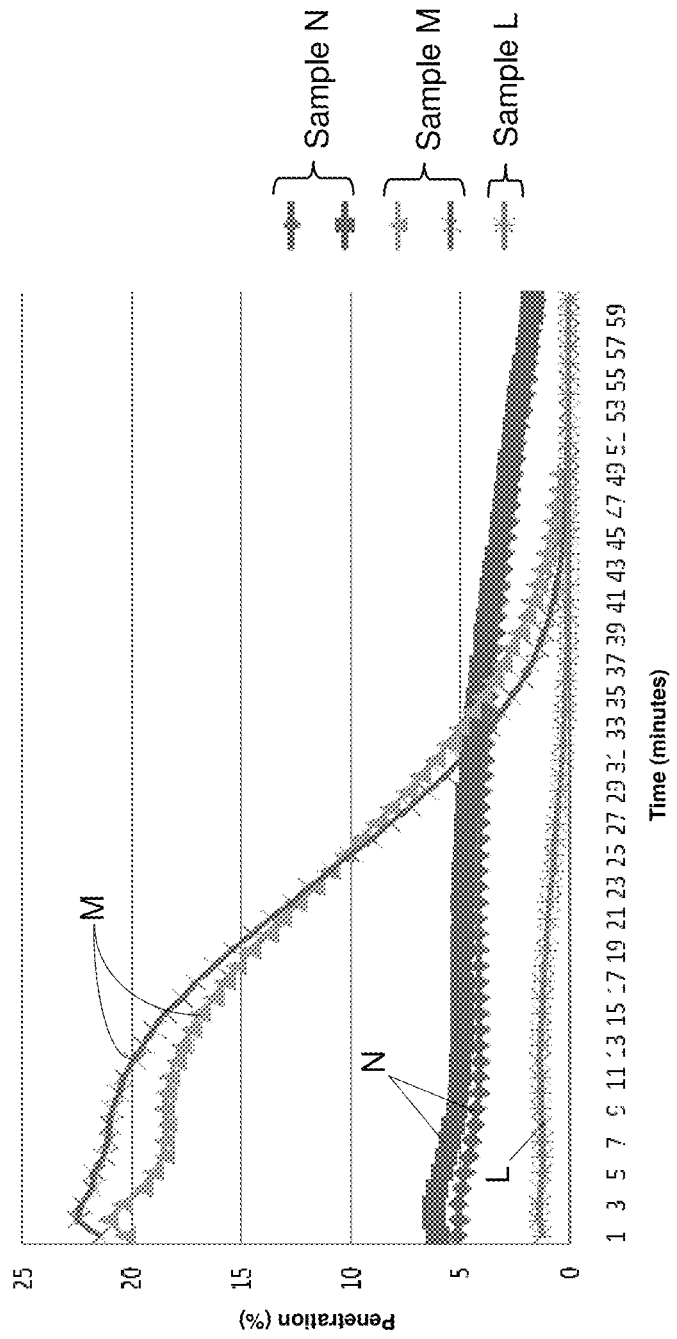
FIG. 15 is a chart showing NaCl penetration versus time for various filter media.

NaCl Penetration tests were performed with Samples L, M and N, as illustrated in FIG. 15, which shows penetration as a function of time. For all samples, penetration decreased as a function of time. It is believed that this occurs because the NaCl particles form a layer within the media that acts as a filter. However, the penetration decreases at a much slower rate for the charged waved media of Sample N than the charged unwaved media of sample M, showing that sample N is loading up more slowly with NaCl particles. The penetration may be decreasing at a higher rate for the charged, unwaved media of sample M since the NaCl particles load much faster into this sample compared to the other samples, as illustrated by the increase in pressure drop shown in FIG. 14. Because Sample N has lower penetration values, it has a higher efficiency as a function of time than Sample M. The lower penetration values of Sample N contribute to the higher NaCl alpha values observed in the charged waved media shown in FIG. 13. Sample L has lower penetration values than Samples M and N in FIG. 15 because Sample L started off with a higher pressure drop, as shown in FIG. 14.

Figure 16:
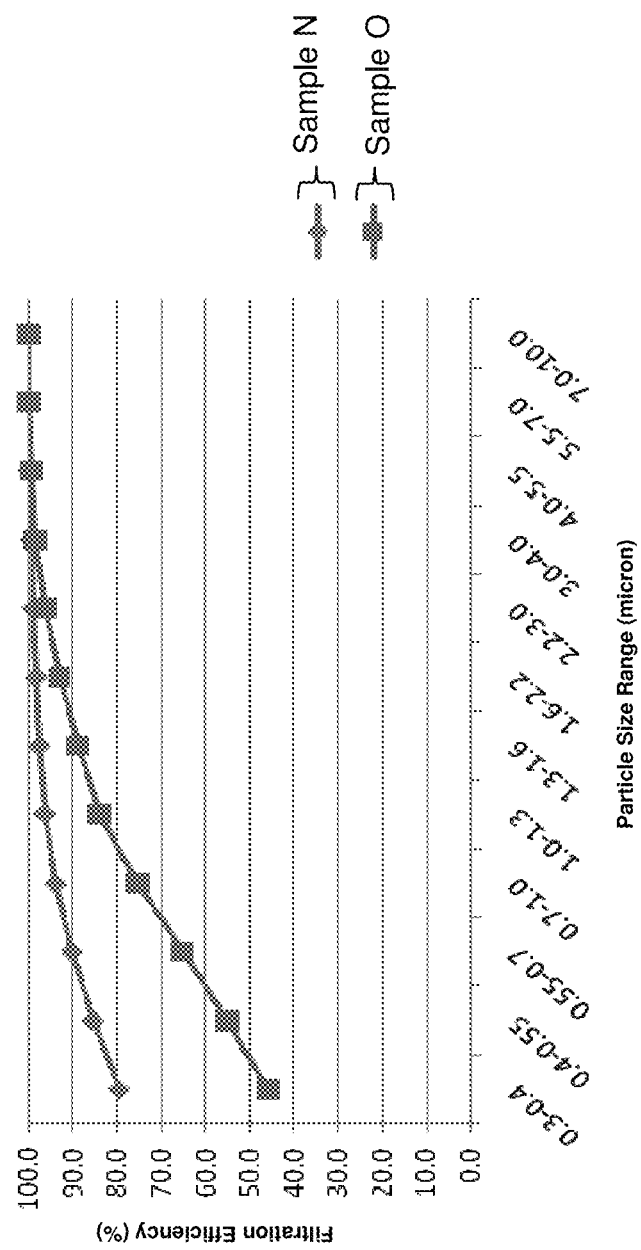
FIG. 16 is a chart showing filtration efficiency versus particle size range for various filter media.

MERV testing was performed with Sample N (waved, charged) and Sample O (waved, uncharged), which were made into 8 pocket ASHRAE bag filters with dimensions of 24"×24"×30" and a surface area of 80 ft$^2$. As shown in FIG. 16, the MERV testing was run with 12 different particle size ranges at a specified face velocity of 25 ft/min at 2000 CFM. As shown in FIG. 16, the filtration efficiency is much higher for smaller particle sizes for the charged media of Sample N compared to the uncharged media of Sample O. Advantageously, the higher efficiency at the same or nearly the same pressure drop allows for higher MERV rated filters, which may be beneficial in the HVAC market among others. The results shown in FIG. 16 indicate that the MERV rating increased from MERV 13 to MERV 15 when comparing the uncharged and charged media, respectively.

One skilled in the art will appreciate further features and advantages of the invention based on the above-described embodiments. Accordingly, the invention is not to be limited by what has been particularly shown and described, except as indicated by the appended claims. All publications and references cited herein are expressly incorporated herein by reference in their entirety.

What is claimed is:

1. A filter media, comprising:
   a membrane filtration layer comprising a plurality of waves having peaks and troughs in a waved configuration, wherein the membrane filtration layer comprises a polymer film including a plurality of pores;
   an upstream coarse support layer that holds the membrane filtration layer in the waved configuration and maintains separation of peaks and troughs of adjacent waves of the membrane filtration layer, wherein the upstream coarse support layer extends across the peaks and into the troughs to fill the troughs; and
   a downstream coarse support layer that holds the membrane filtration layer in the waved configuration and maintains separation of peaks and troughs of adjacent waves of the membrane filtration layer, wherein the downstream coarse support layer extends across the peaks and into the troughs to fill the troughs,
   wherein the membrane filtration layer is disposed between the upstream coarse support layer and the downstream coarse support layer.

2. The filter media of claim 1, wherein the membrane filtration layer comprises PTFE.

3. The filter media of claim 1, further comprising a fine fiber layer comprising a plurality of waves having peaks and troughs in a waved configuration.

4. The filter media of claim 1, wherein the membrane filtration layer is a single layer film.

5. The filter media of claim 1, wherein the membrane filtration layer is a multi-layer film.

6. The filter media of claim 1, wherein the filter media has a DOP alpha value that is greater than 20.

7. The filter media of claim 1, wherein the filter media has a DOP alpha value that is greater than 50.

8. The filter media of claim 1, wherein the filter media has a DOP alpha value that is greater than 70.

9. The filter media of claim 1, wherein the filter media has a thickness in the range of about 1.5 mm to 25 mm.

10. The filter media of claim 1, wherein the filter media has 2 to 6 waves per inch.

11. A filter element comprising the filter media of claim 1.

12. The filter media of claim 1, further comprising a fiber layer comprising a plurality of waves having peaks and troughs in a waved configuration.

\* \* \* \* \*